US012008717B2

(12) United States Patent
Noris et al.

(10) Patent No.: US 12,008,717 B2
(45) Date of Patent: Jun. 11, 2024

(54) ARTIFICIAL REALITY ENVIRONMENT CONTROL THROUGH AN ARTIFICIAL REALITY ENVIRONMENT SCHEMA

(71) Applicant: Meta Platforms Technologies, LLC, Menlo Park, CA (US)

(72) Inventors: Gioacchino Noris, Zürich (CH); Michal Hlavac, Seattle, WA (US); Paul Timothy Furgale, Thalwil (CH); Johannes Joachim Schmid, Zürich (CH); Anush Mohan, San Jose, CA (US); Christopher Richard Tanner, San Carlos, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 401 days.

(21) Appl. No.: 17/369,267

(22) Filed: Jul. 7, 2021

(65) Prior Publication Data
US 2023/0011774 A1    Jan. 12, 2023

(51) Int. Cl.
G06F 16/909    (2019.01)
G06T 19/00    (2011.01)

(52) U.S. Cl.
CPC .................. G06T 19/00 (2013.01)

(58) Field of Classification Search
None
See application file for complete search history.

(56) References Cited

U.S. PATENT DOCUMENTS 770,149 A    9/1904 Bailey
6,842,175 B1    1/2005 Schmalstieg et al.
(Continued)

FOREIGN PATENT DOCUMENTS

EP    2887322 B1    2/2020
WO    2018235371 A1    12/2018
(Continued)

OTHER PUBLICATIONS

Broitman A., "Learn and Do More with Lens in Google Images," Oct. 25, 2018, Retrieved from the Internet: URL: https://www.blog.google/products/search/learn-and-do-more-lens-google-images/ , 4 pages.

(Continued)

*Primary Examiner* — Son T Hoang
(74) *Attorney, Agent, or Firm* — Potomac Law Group, PLLC; Dannon G. Allbee

(57) ABSTRACT

An artificial reality environment (XRE) schema is defined that supports anel-controlling interactions between various artificial reality actors. The XRE schema includes a set of definitions for an XRE, independent of type of artificial reality device. The definitions in the XRE schema can include standards for both interfaces and data objects. The XRE schema can define XR elements in terms of entities and components of a space, organized according to a hierarchy. Each entity can represent a real or virtual object or space, within the XRE, defined by a name and a collection of one or more components. Each component (as part of an entity) can define aspects and expose information about the entity. The XRE schema can specify structures that that allow actors (e.g., producers, instantiators, and consumers) to define and perform actions in relation to XRE elements.

20 Claims, 21 Drawing Sheets

(56) References Cited

U.S. PATENT DOCUMENTS

| | | |
|---|---|---|
| 7,650,575 B2 | 1/2010 | Cummins et al. |
| 7,701,439 B2 | 4/2010 | Hillis et al. |
| 8,335,991 B2 | 12/2012 | Douceur et al. |
| 8,558,759 B1 | 10/2013 | Gomez et al. |
| 8,947,351 B1 | 2/2015 | Noble |
| 9,055,404 B2 | 6/2015 | Setlur et al. |
| 9,081,177 B2 | 7/2015 | Wong et al. |
| 9,117,274 B2 | 8/2015 | Liao et al. |
| 9,292,089 B1 | 3/2016 | Sadek |
| 9,477,368 B1 | 10/2016 | Filip et al. |
| 9,530,252 B2 | 12/2016 | Poulos et al. |
| 9,817,472 B2 | 11/2017 | Lee et al. |
| 10,127,290 B1 | 11/2018 | Armstrong et al. |
| 10,220,303 B1 | 3/2019 | Schmidt et al. |
| 10,248,284 B2 | 4/2019 | Itani et al. |
| 10,473,935 B1 | 11/2019 | Gribetz et al. |
| 10,521,944 B2 | 12/2019 | Sareen et al. |
| 10,713,831 B2 | 7/2020 | Arana et al. |
| 10,867,450 B2 | 12/2020 | Todeschini |
| 10,909,762 B2 | 2/2021 | Karalis et al. |
| 10,963,144 B2 | 3/2021 | Fox et al. |
| 11,023,096 B2 | 6/2021 | Schneider et al. |
| 11,087,029 B1 | 8/2021 | Satpathy |
| 11,087,529 B2 | 8/2021 | Yeung et al. |
| 11,126,320 B1 | 9/2021 | Thompson et al. |
| 11,132,066 B1 | 9/2021 | Blachly et al. |
| 11,132,827 B2 | 9/2021 | Gladkov et al. |
| 11,176,755 B1 | 11/2021 | Tichenor et al. |
| 11,238,664 B1 | 2/2022 | Tavakoli et al. |
| 2008/0089587 A1 | 4/2008 | Kim et al. |
| 2009/0313299 A1 | 12/2009 | Bonev et al. |
| 2010/0251177 A1 | 9/2010 | Geppert et al. |
| 2010/0306716 A1 | 12/2010 | Perez |
| 2011/0267265 A1 | 11/2011 | Stinson |
| 2012/0069168 A1 | 3/2012 | Huang et al. |
| 2012/0143358 A1 | 6/2012 | Adams et al. |
| 2012/0188279 A1 | 7/2012 | Demaine |
| 2012/0206345 A1 | 8/2012 | Langridge |
| 2012/0275686 A1 | 11/2012 | Wilson et al. |
| 2012/0293544 A1 | 11/2012 | Miyamoto et al. |
| 2013/0051615 A1 | 2/2013 | Lim et al. |
| 2013/0063345 A1 | 3/2013 | Maeda |
| 2013/0069860 A1 | 3/2013 | Davidson |
| 2013/0117688 A1 | 5/2013 | Yerli |
| 2013/0125066 A1 | 5/2013 | Klein et al. |
| 2013/0141419 A1 | 6/2013 | Mount et al. |
| 2013/0147793 A1 | 6/2013 | Jeon et al. |
| 2013/0169682 A1 | 7/2013 | Novak et al. |
| 2013/0265220 A1 | 10/2013 | Fleischmann et al. |
| 2014/0125598 A1 | 5/2014 | Cheng et al. |
| 2014/0149901 A1 | 5/2014 | Hunter |
| 2014/0236996 A1 | 8/2014 | Masuko et al. |
| 2014/0268065 A1 | 9/2014 | Ishikawa et al. |
| 2014/0357366 A1 | 12/2014 | Koganezawa et al. |
| 2014/0375683 A1 | 12/2014 | Salter et al. |
| 2014/0375691 A1 | 12/2014 | Kasahara |
| 2014/0378022 A1* | 12/2014 | Muthyala ............... G06F 16/93 |
| 2015/0015504 A1 | 1/2015 | Lee et al. |
| 2015/0035746 A1 | 2/2015 | Cockburn et al. |
| 2015/0054742 A1 | 2/2015 | Imoto et al. |
| 2015/0062160 A1 | 3/2015 | Sakamoto et al. |
| 2015/0077592 A1 | 3/2015 | Fahey |
| 2015/0094142 A1 | 4/2015 | Stafford |
| 2015/0153833 A1 | 6/2015 | Pinault et al. |
| 2015/0160736 A1 | 6/2015 | Fujiwara |
| 2015/0169076 A1 | 6/2015 | Cohen et al. |
| 2015/0181679 A1 | 6/2015 | Liao et al. |
| 2015/0206321 A1 | 7/2015 | Scavezze et al. |
| 2015/0220150 A1 | 8/2015 | Plagemann et al. |
| 2015/0253862 A1 | 9/2015 | Seo et al. |
| 2015/0261659 A1 | 9/2015 | Bader et al. |
| 2015/0356774 A1 | 12/2015 | Gal et al. |
| 2016/0026253 A1 | 1/2016 | Bradski et al. |
| 2016/0093108 A1 | 3/2016 | Mao et al. |
| 2016/0110052 A1 | 4/2016 | Kim et al. |
| 2016/0147308 A1 | 5/2016 | Gelman et al. |
| 2016/0170603 A1 | 6/2016 | Bastien et al. |
| 2016/0173359 A1 | 6/2016 | Brenner et al. |
| 2016/0180590 A1 | 6/2016 | Kamhi et al. |
| 2016/0378291 A1 | 12/2016 | Pokrzywka |
| 2017/0060230 A1 | 3/2017 | Faaborg et al. |
| 2017/0075420 A1 | 3/2017 | Yu et al. |
| 2017/0076500 A1 | 3/2017 | Maggiore et al. |
| 2017/0109936 A1 | 4/2017 | Powderly et al. |
| 2017/0139478 A1 | 5/2017 | Jeon et al. |
| 2017/0192513 A1 | 7/2017 | Karmon et al. |
| 2017/0206691 A1 | 7/2017 | Harrises et al. |
| 2017/0214782 A1 | 7/2017 | Brinda |
| 2017/0242675 A1 | 8/2017 | Deshmukh |
| 2017/0243465 A1 | 8/2017 | Bourne, Jr. et al. |
| 2017/0262063 A1 | 9/2017 | Blénessy et al. |
| 2017/0278304 A1 | 9/2017 | Hildreth et al. |
| 2017/0287225 A1 | 10/2017 | Powderly et al. |
| 2017/0296363 A1 | 10/2017 | Yetkin et al. |
| 2017/0311129 A1 | 10/2017 | Lopez-Uricoechea et al. |
| 2017/0323488 A1 | 11/2017 | Mott et al. |
| 2017/0364198 A1 | 12/2017 | Yoganandan et al. |
| 2017/0372225 A1 | 12/2017 | Foresti |
| 2018/0005429 A1 | 1/2018 | Osman et al. |
| 2018/0059901 A1 | 3/2018 | Gullicksen |
| 2018/0075659 A1 | 3/2018 | Browy et al. |
| 2018/0091304 A1 | 3/2018 | Brook et al. |
| 2018/0095616 A1 | 4/2018 | Valdivia et al. |
| 2018/0107278 A1 | 4/2018 | Goel et al. |
| 2018/0113599 A1 | 4/2018 | Yin |
| 2018/0189647 A1 | 7/2018 | Calvo et al. |
| 2018/0288391 A1 | 10/2018 | Lee et al. |
| 2018/0300557 A1 | 10/2018 | Rodenas et al. |
| 2018/0307303 A1 | 10/2018 | Powderly et al. |
| 2018/0322701 A1 | 11/2018 | Pahud et al. |
| 2018/0329718 A1 | 11/2018 | Klein et al. |
| 2018/0335925 A1 | 11/2018 | Hsiao et al. |
| 2018/0357780 A1 | 12/2018 | Young et al. |
| 2019/0005724 A1 | 1/2019 | Pahud et al. |
| 2019/0094981 A1 | 3/2019 | Bradski et al. |
| 2019/0107894 A1 | 4/2019 | Hebbalaguppe et al. |
| 2019/0114061 A1 | 4/2019 | Daniels et al. |
| 2019/0155481 A1 | 5/2019 | Diverdi et al. |
| 2019/0172262 A1 | 6/2019 | McHugh et al. |
| 2019/0197785 A1 | 6/2019 | Tate-Gans et al. |
| 2019/0213792 A1 | 7/2019 | Jakubzak et al. |
| 2019/0258318 A1 | 8/2019 | Qin et al. |
| 2019/0278376 A1 | 9/2019 | Kutliroff et al. |
| 2019/0279424 A1 | 9/2019 | Clausen et al. |
| 2019/0279426 A1 | 9/2019 | Musunuri et al. |
| 2019/0286231 A1 | 9/2019 | Burns et al. |
| 2019/0317965 A1* | 10/2019 | Remis ............... G06F 16/3322 |
| 2019/0340833 A1 | 11/2019 | Furtwangler et al. |
| 2019/0362562 A1 | 11/2019 | Benson |
| 2019/0369391 A1 | 12/2019 | Cordesses et al. |
| 2019/0377406 A1 | 12/2019 | Steptoe et al. |
| 2019/0377416 A1 | 12/2019 | Alexander |
| 2020/0066047 A1 | 2/2020 | Karalis et al. |
| 2020/0082629 A1 | 3/2020 | Jones et al. |
| 2020/0097077 A1 | 3/2020 | Nguyen et al. |
| 2020/0097091 A1 | 3/2020 | Chou et al. |
| 2020/0174584 A1 | 6/2020 | Schliemann et al. |
| 2020/0210127 A1 | 7/2020 | Browy |
| 2020/0218423 A1 | 7/2020 | Ohashi |
| 2020/0219319 A1 | 7/2020 | Lashmar et al. |
| 2020/0225736 A1 | 7/2020 | Schwarz et al. |
| 2020/0225758 A1 | 7/2020 | Tang et al. |
| 2020/0226814 A1 | 7/2020 | Tang et al. |
| 2020/0285761 A1 | 9/2020 | Buck et al. |
| 2020/0285977 A1* | 9/2020 | Brebner ............... G06F 16/909 |
| 2020/0351273 A1 | 11/2020 | Thomas |
| 2020/0363924 A1 | 11/2020 | Flexman et al. |
| 2020/0363930 A1 | 11/2020 | Srinivasan et al. |
| 2021/0012113 A1 | 1/2021 | Petill et al. |
| 2021/0014408 A1 | 1/2021 | Timonen et al. |
| 2021/0097768 A1 | 4/2021 | Malia et al. |
| 2021/0104100 A1 | 4/2021 | Whitney et al. |
| 2021/0192856 A1 | 6/2021 | Lee |
| 2021/0256769 A1 | 8/2021 | Bailey et al. |

(56) References Cited

U.S. PATENT DOCUMENTS

| | | | |
|---|---|---|---|
| 2021/0272375 | A1 | 9/2021 | Lashmar et al. |
| 2021/0295602 | A1 | 9/2021 | Scapel et al. |
| 2021/0306238 | A1 | 9/2021 | Cheng et al. |
| 2021/0358201 | A1* | 11/2021 | Cady .................. G06F 16/35 |
| 2021/0390765 | A1 | 12/2021 | Laaksonen et al. |
| 2022/0084279 | A1 | 3/2022 | Lindmeier et al. |
| 2022/0091722 | A1 | 3/2022 | Faulkner et al. |
| 2022/0101612 | A1 | 3/2022 | Palangie et al. |
| 2022/0121344 | A1 | 4/2022 | Pastrana Vicente et al. |
| 2022/0139052 | A1 | 5/2022 | Tavakoli et al. |
| 2022/0254120 | A1 | 8/2022 | Berliner et al. |
| 2022/0269888 | A1* | 8/2022 | Stoeva .................. G06F 16/90 |
| 2022/0326967 | A1* | 10/2022 | Khan .................. G06F 16/90 |
| 2022/0392093 | A1 | 12/2022 | Poulad et al. |

FOREIGN PATENT DOCUMENTS

| | | | |
|---|---|---|---|
| WO | 2020226832 | A1 | 11/2020 |
| WO | 2022055822 | A1 | 3/2022 |

OTHER PUBLICATIONS

International Search Report and Written Opinion for International Application No. PCT/US2022/032288, dated Sep. 16, 2022, 11 pages.

Melnick K., "Google Rolls out New AR Features for Its Lens APP," May 28, 2019, Retrieved from the Internet: URL: https://vrscout.com/news/new-ar-features-google-lens/ , 3 pages.

"Unity Gets Toolkit for Common AR/VR Interactions" [accessed Apr. 7, 2020]. Unity XR Interaction Toolkit Preview Dec. 19, 2019.

Hincapie-Ramos, J.D. et al. "GyroWand: IMU-based raycasting for augmented reality head-mounted displays." Proceedings of the 3rd ACM Symposium on Spatial User Interaction, Aug. 2015, pp. 89-98.

International Search Report and Written Opinion, PCT Patent Application PCT/US2020/051763, dated Feb. 3, 2021, 11 pages.

Mayer, S. et al. "The effect of offset correction and cursor on mid-air pointing in real and virtual environments." Proceedings of the 2018 CHI Conference on Human Factors in Computing Systems, Apr. 2018, pp. 1-13.

Olwal, A. et al. "The Flexible Pointer: An Interaction Technique for Selection in Augmented and Virtual Reality," Proceedings of ACM Symposium on User Interface Software and Technology (UIST), pp. 81-82, publication date Nov. 5, 2003.

Renner, P. et al. "Ray Casting". [accessed Apr. 7, 2020], 2 pages.

Schweigert, R. et al. "EyePointing: A gaze-based selection technique." Proceedings of Mensch and Computer, Sep. 8, 2019, pp. 719-723.

Invitation to Pay Additional Fees for International Application No. PCT/US2021/044098, dated Nov. 3, 2021, 15 pages.

Game Ui Examples: "[VR] Half Life Alyx Menu/Settings/UI," Feb. 27, 2021, 2 pages, retrieved from the Internet URL: https://www.youtube.com/watch?v=- iNR-J2whJQ&t=7s.

International Search Report and Written Opinion for International Application No. PCT/US2023/033526, dated Dec. 1, 2023, 13 pages.

\* cited by examiner

| 726 | 728 | 730 |
|---|---|---|
| {Anchor} | Used to define an origin transform | Transform GetTransform() |

| 732 | 734 | 736 |
|---|---|---|
| {GUID} | Used to uniquely identify the entity | GUID GetGUID() |

{SpaceConnectivity} — 703

Specifies the connection between the owner space and other — 769
spaces. — 705

(0+) [Portal]
(0+) [Elevator]

— 707
List<Entity> GetDoorways()
GUID GetConnectedRoom(PairConnection connection)
List<Entity> getElevators()
List<GUID> GetConnectedRoom(MultiConnection connection)

[Portal] — 709

— 711
A 2D separation between two connected indoor Spaces. Can be used to represent doorways, staircases, or simply narrow passages.

— 713
(1) {Anchor}
(1) {SpacePairConnection}

[Elevator] — 715

— 717
An elevator connecting multiple spaces on different floors.

— 719
(1) {Anchor}
(1) {MultiConnection}

{PairConnection} — 721

— 723
Specifies the connection between exactly two spaces.

(2) [Room] — 727

List<GUID> GetRooms() — 729

{MultiConnection} — 731

— 733
Specifies the connection between multiple spaces.

(2+) [Room] — 735

List<GUID> GetRooms() — 739

— 701

ARTIFICIAL REALITY ENVIRONMENT CONTROL THROUGH AN ARTIFICIAL REALITY ENVIRONMENT SCHEMA

TECHNICAL FIELD

The present disclosure is directed to controlling interactions between various artificial reality entities with a defined artificial reality environment schema.

BACKGROUND

Interaction with computing systems are often founded on a set of core concepts that define how users can interact with that computing system. For example, early operating systems provided textual interfaces to interact with a file directory. This was later built upon with the addition of "windowing" systems whereby levels in the file directory and executing applications were displayed in multiple windows, each allocated a portion of a 2D display that was populated with content selected for that window (e.g., all the files from the same level in the directory, a graphical user interface generated by an application, menus or controls for the operating system, etc.) As computing form factors decreased in size and added integrated hardware capabilities (e.g., cameras, GPS, wireless antennas, etc.) the core concepts again evolved, moving to an "app" focus where each app encapsulated a capability of the computing system.

When computing systems provide a platform for implementing software developed by others, they often include an application programming interface or schema, allowing these other systems to perform a standard set of actions within the platform. Such s schema can provide interfaces and standard objects for interacting within the platform. The schema allows software producers to define data elements and access functions in a standard way that will be acceptable to the platform. The schema further allows entities that instantiate software products built with the schema to expect a set of schema-defined standard functionality from the software products. Finally, the schema allows users on the platform to exchange standard sets of information for interoperability.

BRIEF DESCRIPTION OF THE DRAWINGS

FIGS. 7A-7G are block diagrams illustrating example XR elements defined in an XRE schema.

The techniques introduced here may be better understood by referring to the following Detailed Description in conjunction with the accompanying drawings, in which like reference numerals indicate identical or functionally similar elements.

DETAILED DESCRIPTION

Figure 1:
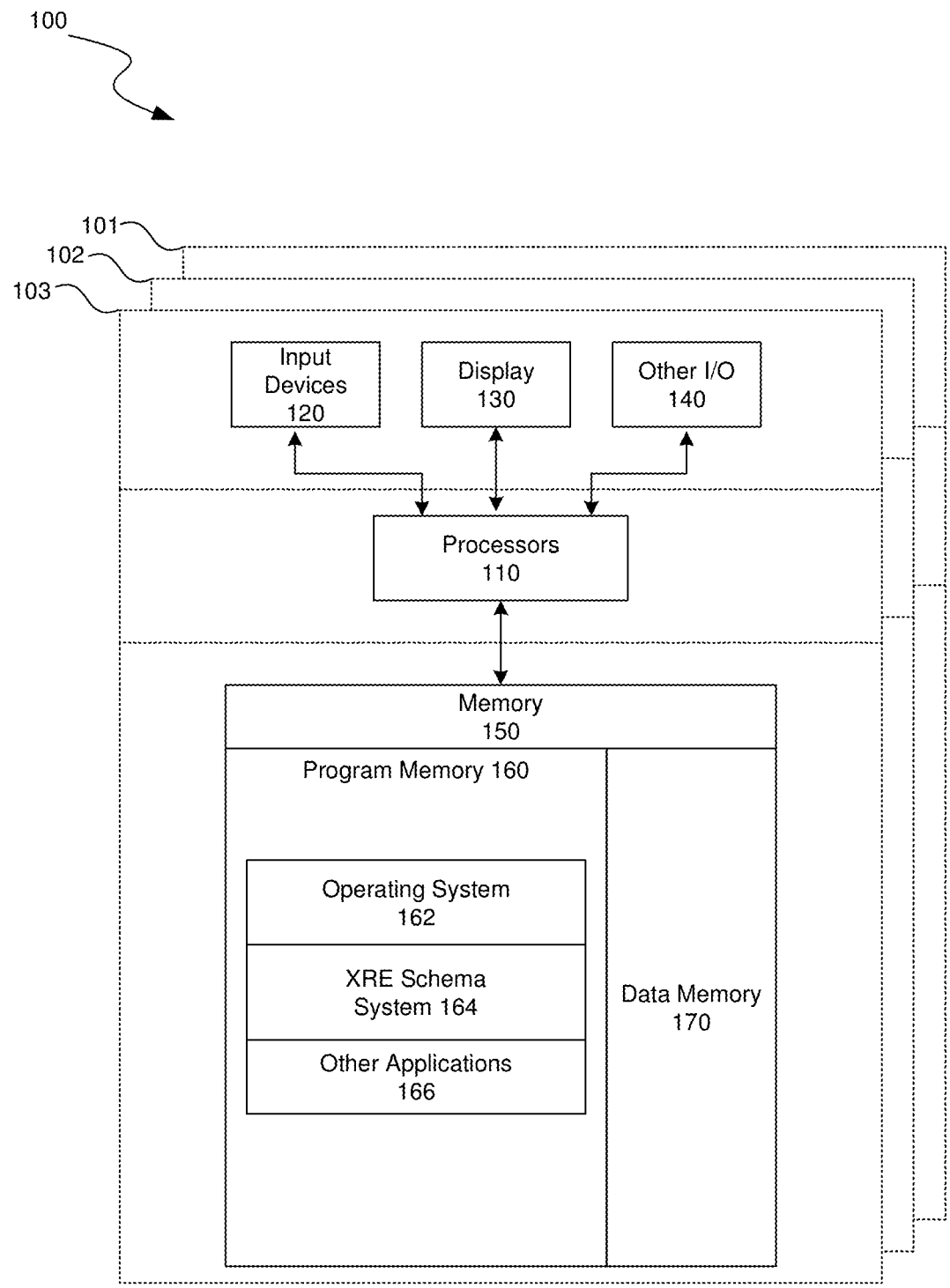
FIG. 1 is a block diagram illustrating an overview of devices on which some implementations of the present technology can operate.

Aspects of the present disclosure are directed to defining an artificial reality environment (XRE) and controlling interactions between various artificial reality actors with a defined XRE schema. The XRE schema includes a set of definitions for an artificial reality environment that are device-agnostic, i.e., are independent of whether that artificial reality environment is generated for virtual reality (VR), mixed reality (MR), augmented reality (AR), or another artificial reality (XR) system. The definitions in the XRE schema can include standards for both interfaces and data objects. The XRE schema can define XR elements in terms of entities and components of a spatial "room," defined as a hierarchy. Because these elements are not depending on a particular type of artificial reality, elements defined in the XRE schema can be shared and used across types of artificial reality platforms.

Each entity can represent a real or virtual object or space, within an artificial reality environment, defined by a name and a collection of one or more components. As used herein, an n-gram surrounded by brackets [ ] define an entity. For example, "[Room]" defines a room entity.

Each component (as part of an entity) can define aspects and expose information about the entity—through meta-data components (e.g., by being a GUID component, an anchor point component, etc.), through fundamental components (e.g., by being a point component, line component, mesh component, etc.), and/or with a collection of other entities contained in the component (e.g., a PhysicalBoundries component can include zero or more wall entities, zero or more floor entities, and zero or more ceiling entities). Each component can provide access to a set of zero or more entities included in the component and/or a set of zero or more functions or actions that can be performed in relation to that component. For example, a component may include a "getComponentName( )" function, a "getComponentDescription( )" function, a "getComponentEntities( )" function, etc. Some components can have internal data or links to virtual objects that exist in the artificial reality environment, for example, a "line" component may have a function "getPoints( )," which returns a list of points forming the line, and "getDirection( )" which returns a vector for the line. As used herein, an n-gram surrounded by braces { } define a component. For example, "{Plane}" defines a plane (i.e., flat surface) component.

Various elements (entities and components) may be defined types in the XRE schema. Defined entity types can have guarantees specifying a number of components of a particular type that entity must have; and defined component types can have guarantees specifying a number of entities of a particular type that component must have. For example, a "wall" entity type may be defined to always have exactly one anchor point, one container, and one plane. As used herein, a number surrounded by parentheses ( ), followed by an element, defines a guaranteed number of that element. For example, "(1){Volume}" defined as part of a list of components in a room entity, specifies that the room entity has exactly one volume component. Guarantee notation when specified as a single number defines an exact amount of that element (as in the previous example). A+ notation can specify a guarantee, of the preceding given number or more, of the following element type. For example, "(2+)[Wall]" defined as part of a list of entities in a PhysicalBoundaries component, specifies that the PhysicalBoundaries component has two or more wall entities. A | notation can specify a guarantee, of the before or after given number, of the following element type. For example, "(0|1)[Stairs]" defined as part of a list of entities in a PhysicalBoundaries component, specifies that the PhysicalBoundaries component has either zero or one, but no other amounts, of stairs entities. As used herein parent elements that "have," "link to," "include," "contain," or otherwise specify other child elements can do so by having a reference to those other child elements (e.g., a pointer, a GUID, hierarchy location, etc.) or the data structure for the parent element can contain the data structures for the child elements.

Each artificial reality environment specified in the XRE schema can be defined by a hierarchy, which can be a directed acyclic graph (DAG). The nodes in the hierarchy can be the elements defined for the artificial reality environment with parent/child relationships defining which elements (children) are "contained within" (e.g., are spatially within or provide information for) the parent element. Such relationships are referred to as "links" herein. In various implementations, each element can have exactly one parent element or can have multiple parent elements. As an example of a node having multiple parent elements, a room entity can include A) a container component having all the other entities within the room and B) a PhysicalBoundaries component defining Wall, Floor, and Ceiling entities for the room; a Wall entity may be a child element of both the room's container component and the room's Physical-Boundaries component. In some implementations, the hierarchy can specify an entity root node, which in some cases is a "room" entity. Additional details on the XRE schema definitions are discussed below in relation to FIGS. 5-7.

In practice the XRE schema can define data structures and functions for interactions between actors in an artificial reality environment. In some cases, the actors can comprise producers, instantiators, and consumers. The XRE schema can define interfaces through components that that allow actors to perform defined actions in relation to artificial reality environment elements. In various cases, the multiple actors may not be simultaneously acting with or in an artificial reality environment, but may define elements according to the XRE schema for access by other actors. For example, a producer may initially define an entity type, and that entity definition can be included in an application that is downloaded to an XR device where the application is run to instantiate an instance of the entity type.

A producer is an actor that defines, through the XRE schema, element types. A producer may define an element type, with a constructor for that element type ensuring that the guarantees for an element type are met when an element of that type is instantiated. Examples of producers include system and application developers who construct elements that can be instantiated into an artificial reality environment, e.g., upon certain calls or identified artificial reality environment contexts. For example, an XR device operating system can define a flow for creating a bespoke surface, accessible to running applications, upon detecting a real world surface that matches given dimensions. Additional details on a producer defining an element in the XRE schema are provided below in relation to FIG. 8.

An instantiator is an actor that causes elements, defined by the producers, to be created in an artificial reality environment. Instantiators can be parts of an application, operating system, or other control system that watch for triggers or contextual conditions that invoke a constructor from a producer. Thus, instantiators identify the artificial reality environment variables for a constructor, call the constructor, and receive back an element that is part of the artificial reality environment hierarchy. Instantiators can receive trigger and context information from sources such as end-user interactions (e.g., a gesture or command to create an object), sensors or other machine perception interfaces (e.g., cameras paired with object recognizers that identify surrounding real-world objects, which may be mapped to the construction of various artificial reality environment elements), or local or network data sources (e.g., device or cloud sources that provide data elements, which may be mapped to the construction of various artificial reality environment elements). Additional details on an instantiator creating an element, in the XRE schema, using an element definition defined by a producer are provided below in relation to FIG. 9.

A consumer is an actor that accesses or updates information defined in elements instantiated in an artificial reality environment according to the XRE schema. An example of a consumer is an operating system or shell feature that queries and sets parameters for existing artificial reality environment elements. Another example of a consumer is an installed application which can query for and perform actions on artificial reality environment elements instantiated into the artificial reality environment. Additional details on consumers querying and interacting with elements, in the XRE schema, are provided below in relation to FIG. 10. In various implementations, actors are not necessarily defined as a producer, instantiator, and/or consumer, and in some cases an actor can take actions as each of a producer, instantiator, and/or consumer.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer).

Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Existing AR, VR, and MR systems each define their own data objects and environment variables. This prevents elements defined for one type of XR system from being accessible in another type of XR system. Even simple stand-alone virtual objects may have different function types and variables, preventing that object when defined in one system from being transferable to another system. Further, many XR systems don't specify interfaces and guarantees for XR elements, causing errors even within the same XR system when an element is defined by a producer, instantiated by a separate instantiator, and used by yet another consumer, each of which may have different assumptions about features of an element.

The XRE schema, systems, and processes described herein are expected to overcome these issues in the prior art by defining elements of an artificial reality environment in a manner that can be consistent across XR systems and system types. These element definitions, together with defined relationships among the elements (both through a hierarchy of elements and guarantees in element construction), and interaction methods for actors related to the artificial reality environment (e.g., producers, instantiates, and consumers), ensure consistent artificial reality environment definitions and interactions, eliminating incompatibilities and errors between systems and actors.

Several implementations are discussed below in more detail in reference to the figures. FIG. 1 is a block diagram illustrating an overview of devices on which some implementations of the disclosed technology can operate. The devices can comprise hardware components of a computing system 100 that controls interactions between various artificial reality actors with a defined artificial reality environment schema. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, XRE schema system 164, and other application programs 166. Memory 150 can also include data memory 170 that can include constructed artificial reality environment elements, element definitions (with constructors, access interface functions, guarantees, etc.), element hierarchies, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
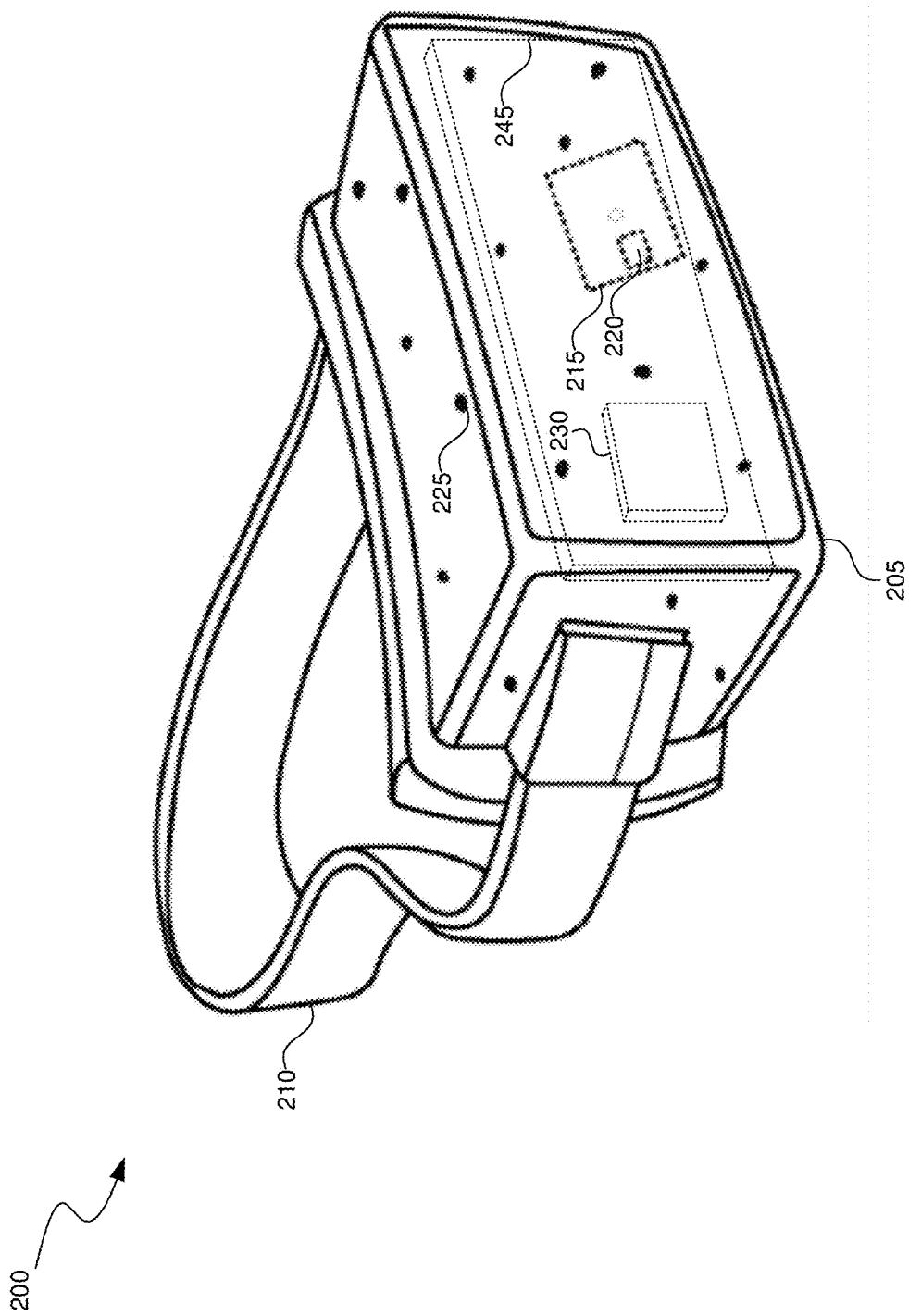
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3 DoF) or six degrees of freedom (6 DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
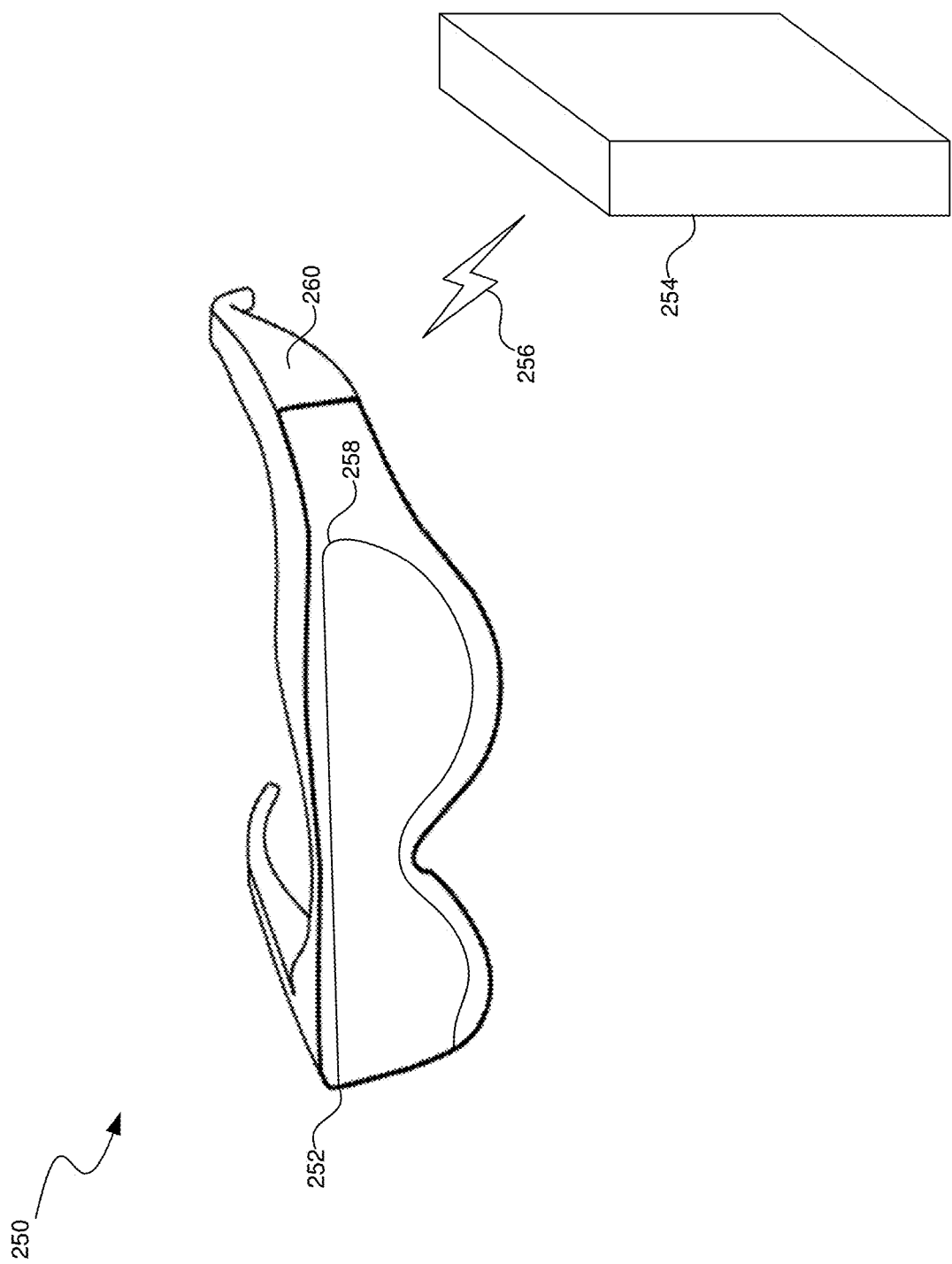
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3 DoF or 6 DoF, track portions of the user (e.g., hands, feet, head, or other body parts), map virtual objects to appear as stationary as the HMD 252 moves, and have virtual objects react to gestures and other real-world objects.

Figure 2C:
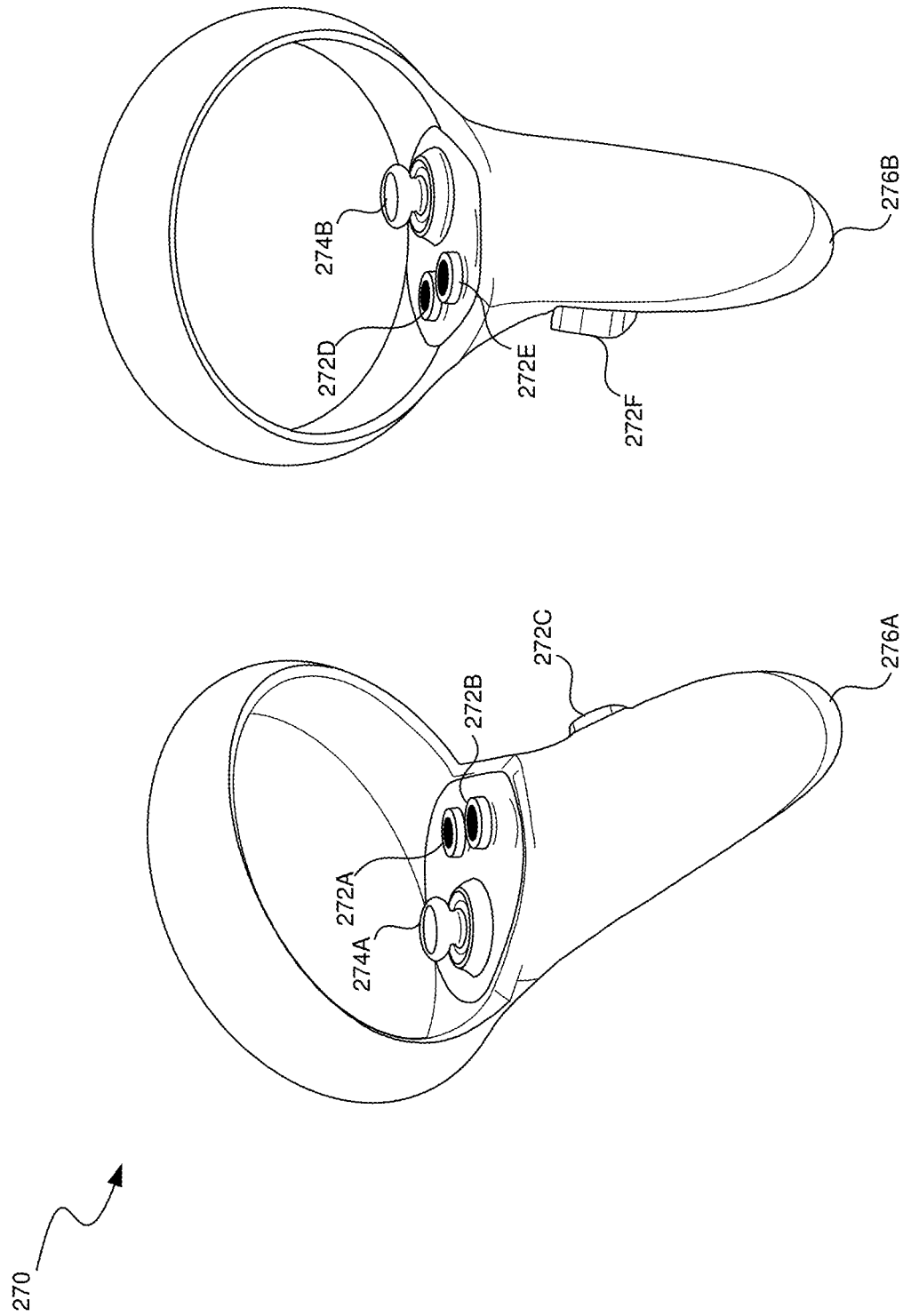
FIG. 2C illustrates controllers, which, in some implementations, a user can hold in one or both hands to interact with an artificial reality environment.

FIG. 2C illustrates controllers 270, which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3 DoF or 6 DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc. To monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions.

Figure 3:
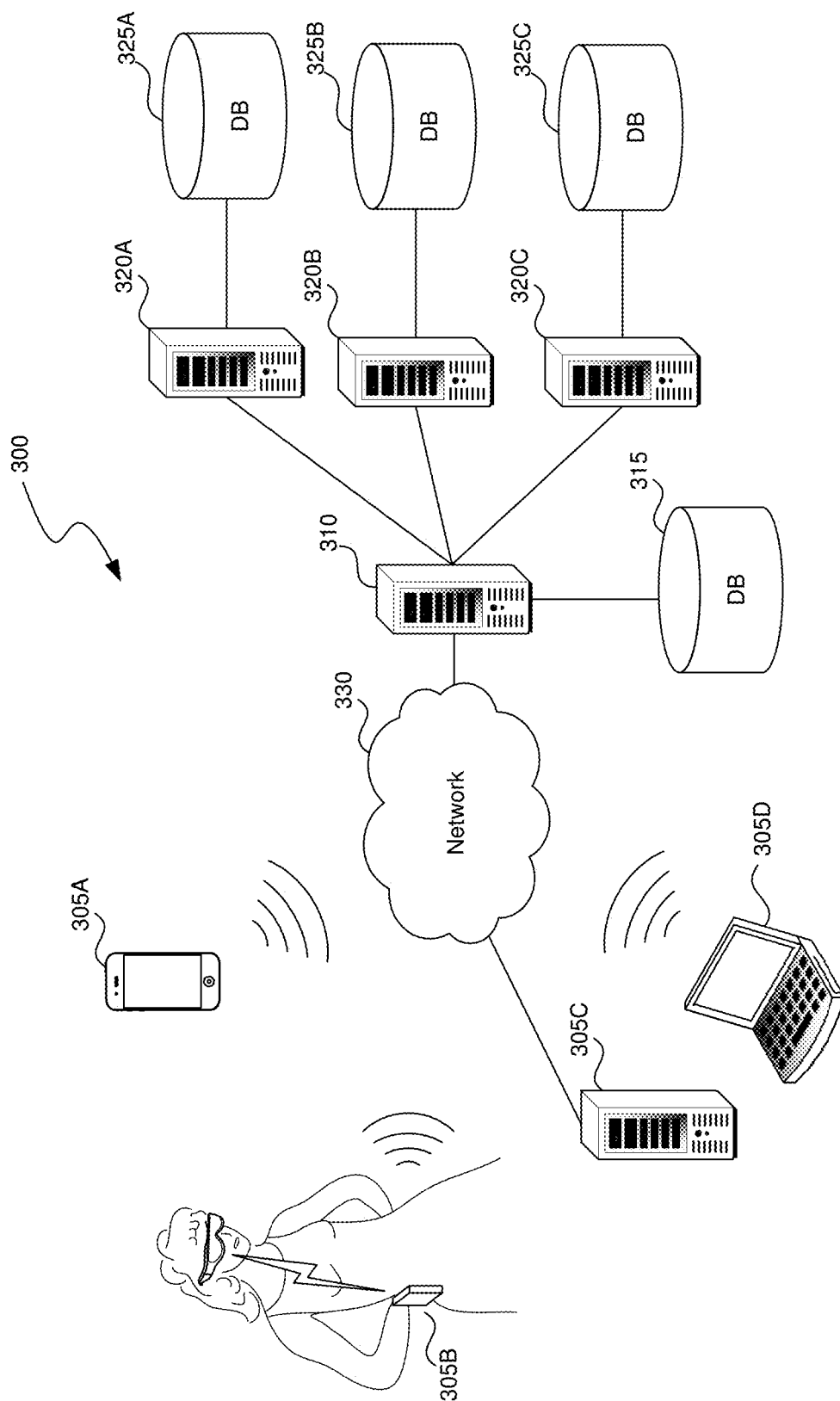
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
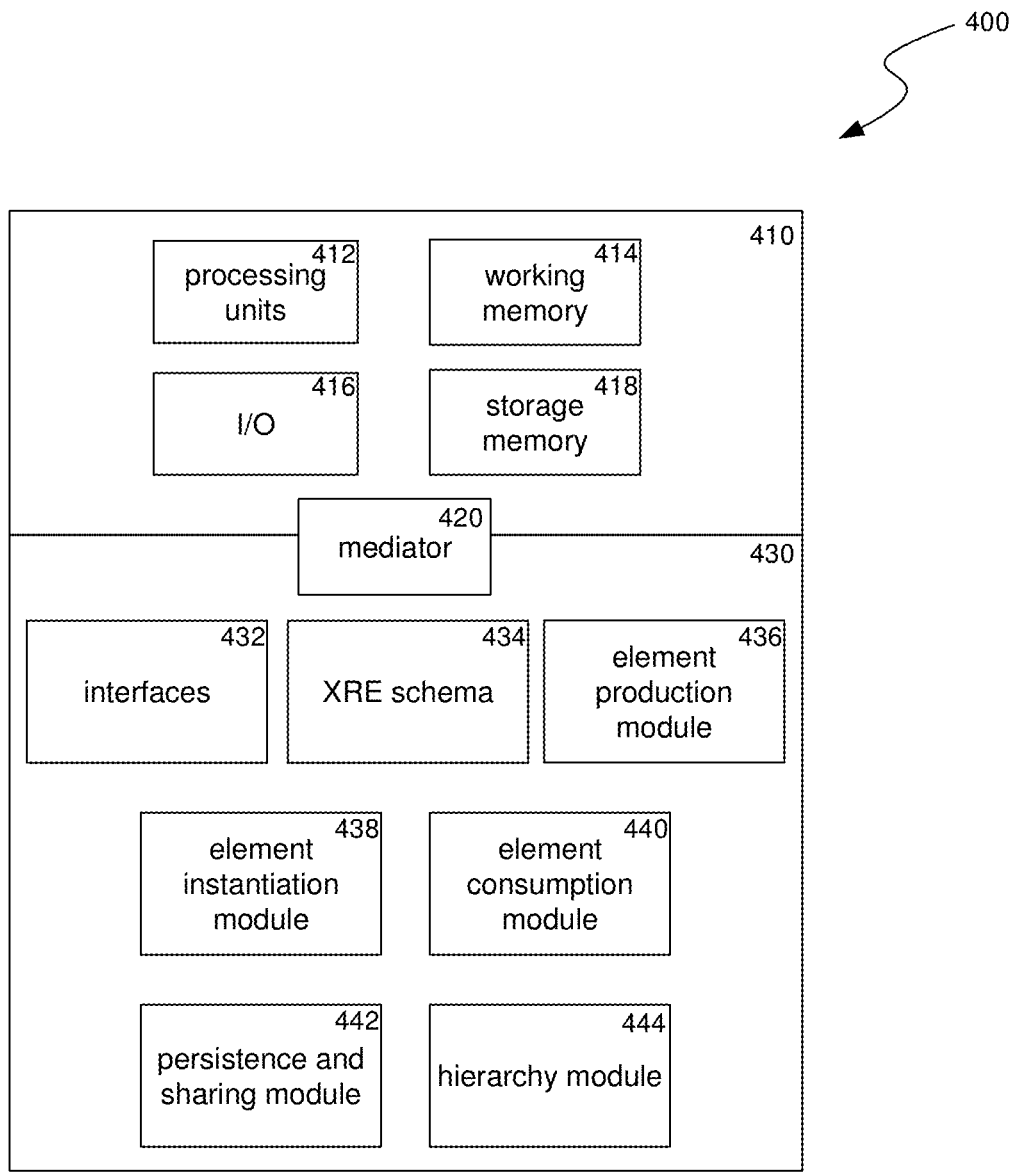
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for defining an artificial reality environment and controlling interactions between various artificial reality actors. Specialized components 430 can include XRE schema 434, element production module 436, element instantiation module 438, element consumption module 440, persistence and sharing module 442, hierarchy module 444, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

XRE schema 434 can define a set of elements, each as either an entity or a component, where each entity has a defined name and component list, and each component has a defined name any may include an entity list and/or query list. Some of the elements can be generic entities or components and some of the elements can be producer-defined entities or components. Additional details on generic and producer-defined elements are discussed below in relation to FIGS. 6A and 7B. In some implementations, the XRE schema 434 can include a set of default entities and components such as a hierarchy root entity (see details described in relation to FIG. 7A), meta-data components (see details described in relation to FIG. 7C), fundamental components (see details described in relation to FIG. 7D), purposed components (see details described in relation to FIG. 7E), space connection components (see details described in relation to FIG. 7F), and/or physical boundaries components (see details described in relation to FIG. 7G). Additional details on the structure of an XRE schema are provided below in relation to FIGS. 5-7.

Element production module 436 can be used by producers to define new elements according to the XRE schema. A producer can define an entity with a name, description, and component list (with guarantees for amounts of component types), further specifying the components on the component list either by including existing components or defining new ones. New components can be defined by supplying a component name, component description, entity list (with guarantees for amounts of entity types), and query list. Additional details on defining new elements are provided below in relation to FIG. 8.

Element instantiation module 438 can be used by an instantiator to generate instances of elements defined in the XRE schema. Element instantiation module 438 can accomplish this by obtaining parameters for the element to be instantiated (e.g., surrounding objects and surfaces, environment conditions, user status, etc.), call an element constructor defined for the element, and receive back a constructed instance of the element. In some cases, element instantiation module 438 can be used to instantiate elements for multiple features, in an artificial reality environment, each as an element defined by the XRE schema as either an entity or a component. Additional details on instantiating instances of elements are provided below in relation to FIG. 9.

Element consumption module 440 can be used by a consumer to access elements defined under the XRE schema. Element consumption module 440 can accomplish this by obtaining an element handle for an element (e.g., through a name or ID search, by traversing a hierarchy, etc.) and, via the handle, either accessing query functions defined for the element or performing get or set operations in relation to parts of the element. Additional details on accessing instantiated elements are provided below in relation to FIG. 10.

Persistence and sharing module 442 can store instantiated instances of elements on an XR device and/or share those instances with another XR device (directly or via a cloud repository). Because elements defined according to the XRE schema are device agnostic, such sharing can be between devices of different XR types. Additional details on persistence and sharing are provided below in relation to blocks 514 and 516 of FIG. 5.

Hierarchy module 444 can control a hierarchy for all the elements defined for an artificial reality environment. In some implementations, the hierarchy can be a directed acyclic graph (DAG). Nodes in the hierarchy can be elements or can be other references that correspond to elements. A hierarchy can have a root node of a defined type (such as a room node). Edges in the hierarchy can specify which nodes link to other nodes though parent/child relationships. For example, an entity that specifies a component can be the parent of that component. In some cases, hierarchy module 444 can add to the hierarchy a node for each of multiple features (e.g., for elements instantiated by element instantiation module 438) of an artificial reality environment. Additional details on a hierarchy for a space are provided below in relation to FIG. 6B, block 906 of FIG. 9, and block 1002 of FIG. 10.

Figure 5:
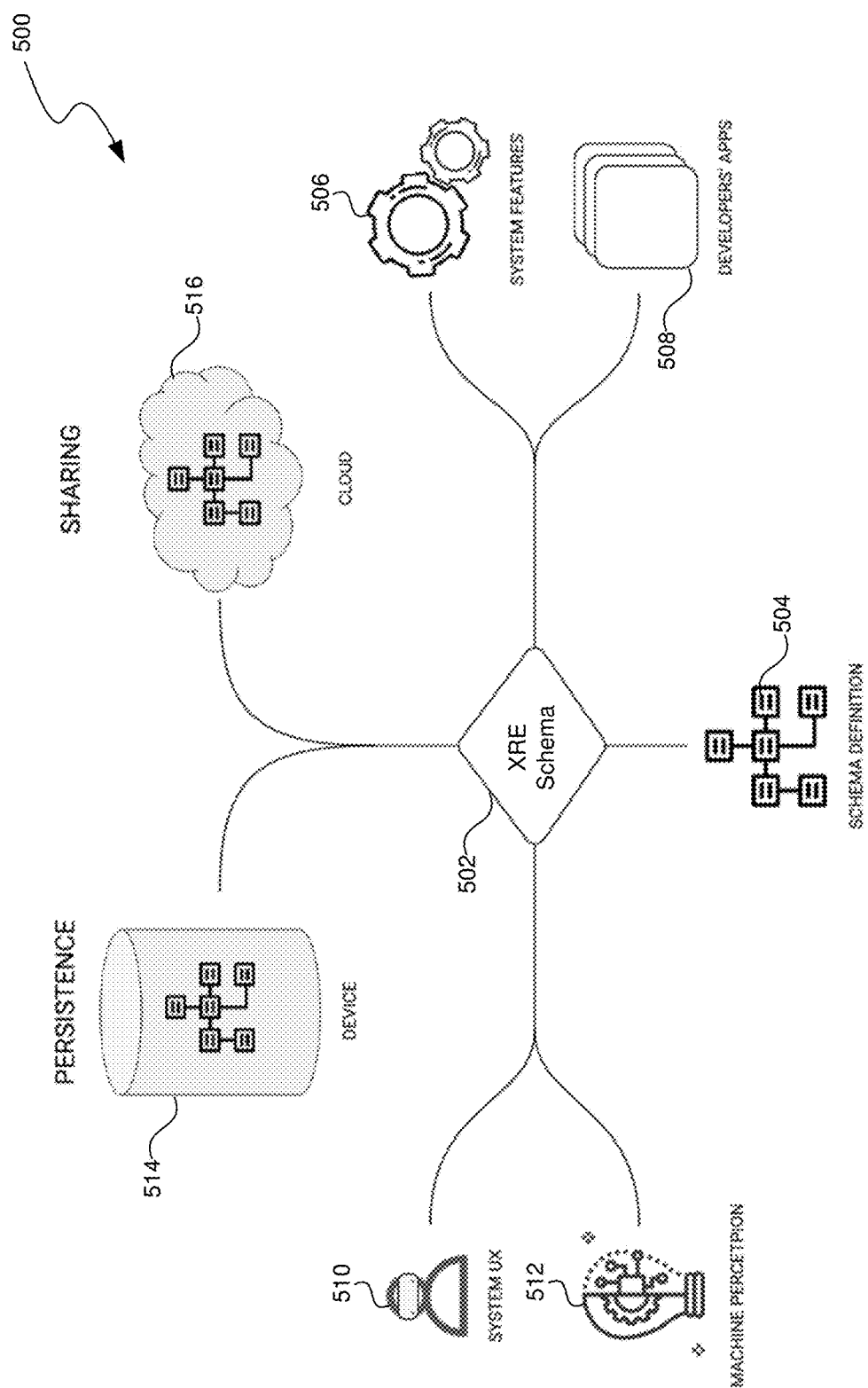
FIG. 5 is a block diagram illustrating interactions between actors and data structures implementing an XRE schema.

FIG. 5 is a block diagram illustrating example 500 of interactions between actors and data structures implementing an XRE schema. In example 500, actors define elements and element access interfaces (e.g., APIs) according to the XRE schema 502. The XRE schema 502 includes a schema definition 504 specifying XR elements as either entities or components. Any given artificial reality environment, and the virtual objects within it, can be defined according to the definitions 504 of the XRE schema. As discussed below in relation to FIGS. 6 and 7, the elements of an artificial reality environment can form a series of nested relationships in a hierarchy, with a root entity containing one or more components, which in turn can each contain additional entities. The APIs and other functions of elements allow artificial reality environment consumers to query for elements of the artificial reality environment and discover what is there.

The XRE schema specifies the language used by the artificial reality environment actors to describe, access, and share spatial information. Through APIs for defined elements, actors can use these interfaces to access features of an XR space; create, access, and update virtual objects; and store, retrieve, and share virtual objects. Actors that can perform these actions can include producers who define elements in the XRE schema, instantiators who instantiate instances of the elements defined by the producers with artificial reality environment specifics, and consumers who use instantiated instances of elements in an XR device. In various cases, the producer, instantiator, consumer roles can be performed by the same or different actors. As a first example, an application can define a "desk" entity containing a number of surface components; when that application is downloaded and executed on an MR device, the application instantiates an instance of the desk, setting size and location parameters; as a user interacts with the artificial reality environment containing the desk instance, the application adds items to the top surface of the desk in response to user commands. In this first example, the application is each of the producer, instantiator, and consumer for the desk virtual object. In a second example, an artificial reality environment control application (e.g., an operating system of an VR device) can define a "wall" entity containing a vertical surface component; when a first application creates a virtual room, it can call an API constructor for the wall entity, setting size and location parameters and adding it as an entity in a physicalBoundaries component of a room entity; when a second application executes and receives a command to hang a picture on the wall entity, it can make a call to a placeObject(object) function of the vertical surface of the wall entity, passing the picture object, which the function adds to the vertical surface. In this second example, the control application is the producer of the wall entity, the first application is the instantiator of an instance of the wall entity, and the second application is a consumer of that instance of the wall entity.

In example 500, system features 506 and developers' apps 508 can be producers with defined elements in the XRE schema 502. For example, these applications can define triggers for creating elements in the artificial reality environment, with corresponding constructors that can be called by instantiators to add elements to the artificial reality environment hierarchy. System user interface 510 and machine perception 512 can identify events that define the variable to pass to these constructors. For example, machine perception 512 may use visual data captured by a XR device and a set of machine learning models to identify aspects of a physical space (e.g., physical surfaces and anchor points, objects in the area, identify other user, etc.) and other information (e.g., movements of the XR device and user, data gathered from third parties, etc.). These can be passed to constructors for elements of a room (e.g., defined in system features 506 or developers' apps 508) to define the space as an artificial reality environment—correctly mapping conceptual features to their real-world counterparts (e.g., having a defined "wall" entity with a coordinates component that matches the position of a real-world wall).

As another example, system UX 510 may receive user inputs (e.g., gestures, spoken commands, body positions, etc.) which can be passed as parameters to corresponding constructors (e.g., defined in system features 506 or developers' apps 508) to further generate artificial reality environment elements. In some cases, the variables defined by system UX 510 and machine perception 512 can be used together in the same constructor.

In example 500, system features 506 and developers' apps 508 can also be consumers that access artificial reality environment elements via the APIs and other functions defined for the elements in the XRE schema 502. For example, a system feature 506 can act as a producer with a defined "table" entity, and act as an instantiator, getting an anchor point from machine perception system 512 which it passes to the table's constructor to instantiate an instance of the table entity in the artificial reality environment hierarchy; a developer app 508 can then access the table entity, as a consumer, via the artificial reality environment hierarchy and update its location by calling a setLocation(anchor) function of a location component of the table entity.

Example 500 also includes storage 514 illustrating the persistence of the elements by having them stored on the XR device and cloud 516 illustrating the ability of the elements to be shared between XR devices, including different types (e.g., VR, AR, MR, etc.) For example, each element can have a function to serialize/de-serialize it (e.g., as an XML element, JSON blob, simple string, etc.) for storage and sharing.

Figure 6A:
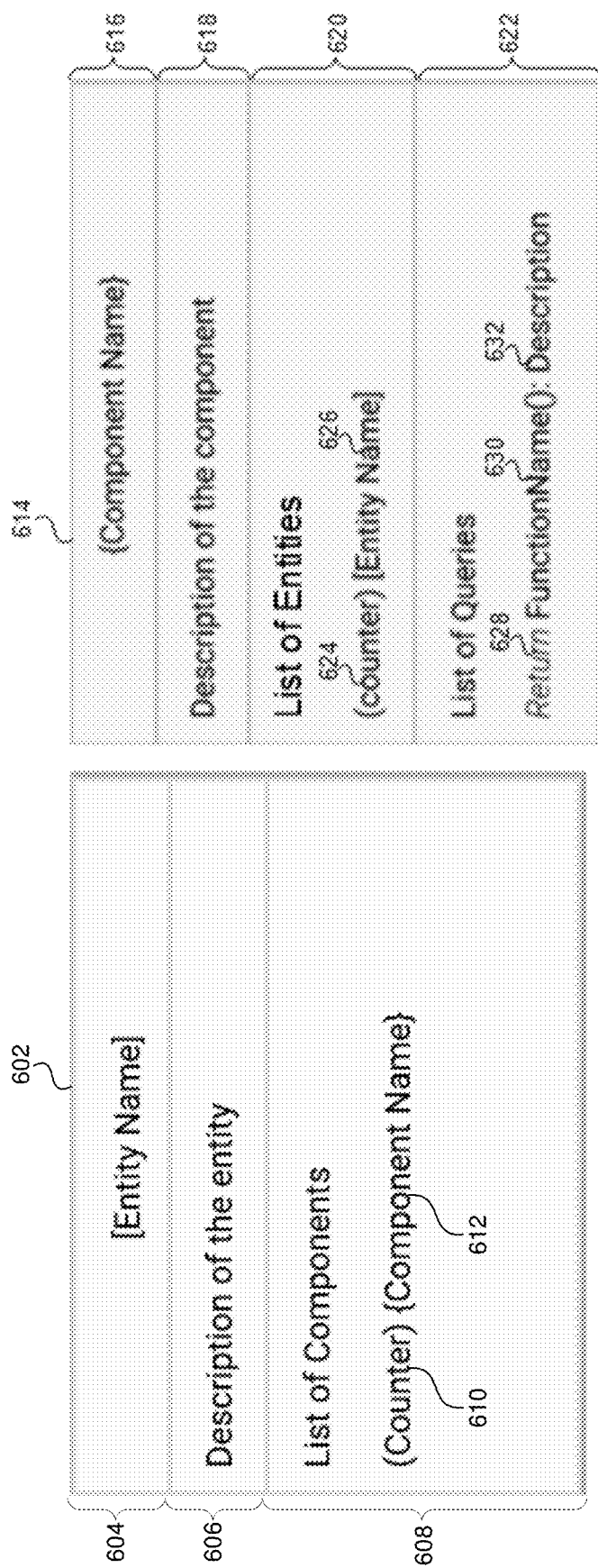
FIG. 6A is a block diagram illustrating an XRE schema defining XR elements in terms of entities and components.

FIG. 6A is a block diagram illustrating an XRE schema defining XR elements in terms of entities and components. An XR space can be defined as a set of elements of the XRE schema, whether the virtual elements in the XR space are generated by an AR device, VR device, MR device, etc. The elements can be entities or components. These elements can be nested (e.g., entities can contain components and some components can contain further entities), forming a hierarchy as discussed below in relation to FIG. 6B.

Entities can have an entity structure 602, with fields such as a name 604, a description 606, and a list of components 608 that the entity contains. Each component in the list of components can have a name 612 and a guarantee 610 with a counter specifying an amount of that component included in the entity.

Components can have a component structure 614, with fields such as a name 616, a description 618, a list of entities 620 that the component contains, and a list of queries 622 that can be executed against the component. Each entity in the list of entities can have a name 626 and a guarantee 624 with a counter specifying an amount of that component included in the entity. Each function in the list of queries can specify a name 630 for calling the function (which may include a list of parameters the function takes), a description 632, and a return type 628 specifying a type of data element (if any) the function returns.

A guarantee for an entity specifies a number of components of a particular type that entity must have and a guarantee for a component specifies a number of entities of a particular type that component must have. For example, a "wall" entity type may be defined to always have exactly one anchor point, one container, and one plane. As used herein, a number surrounded by parentheses ( ), followed by an element, defines a guaranteed number of that element. For example, "(1){Volume}" defined as part of a list of components in a room entity, specifies that the room entity has exactly one volume component. Guarantee notation when specified as a single number defines an exact amount of that element (as in the previous example). A + notation can specify a guarantee, of the preceding given number or more, of the following element type. For example, "(2+)[Wall]" defined as part of a list of entities in a PhysicalBoundaries component, specifies that the PhysicalBoundaries component has two or more wall entities. A | notation can specify a guarantee, of the before or after given number, of the following element type. For example, "(0|1)[Stairs]" defined as part of a list of entities in a PhysicalBoundaries component, specifies that the PhysicalBoundaries component has either zero or one, but no other amounts, of stairs entities.

In some implementations, elements may also specify privacy or security settings. These settings can set particular consumers that are allowed to see or access features of the element or access levels that a consumer must have to see or access features of the element. In some implementations, different features (e.g., properties, functions) of an element may have different privacy or security settings.

Figure 6B:
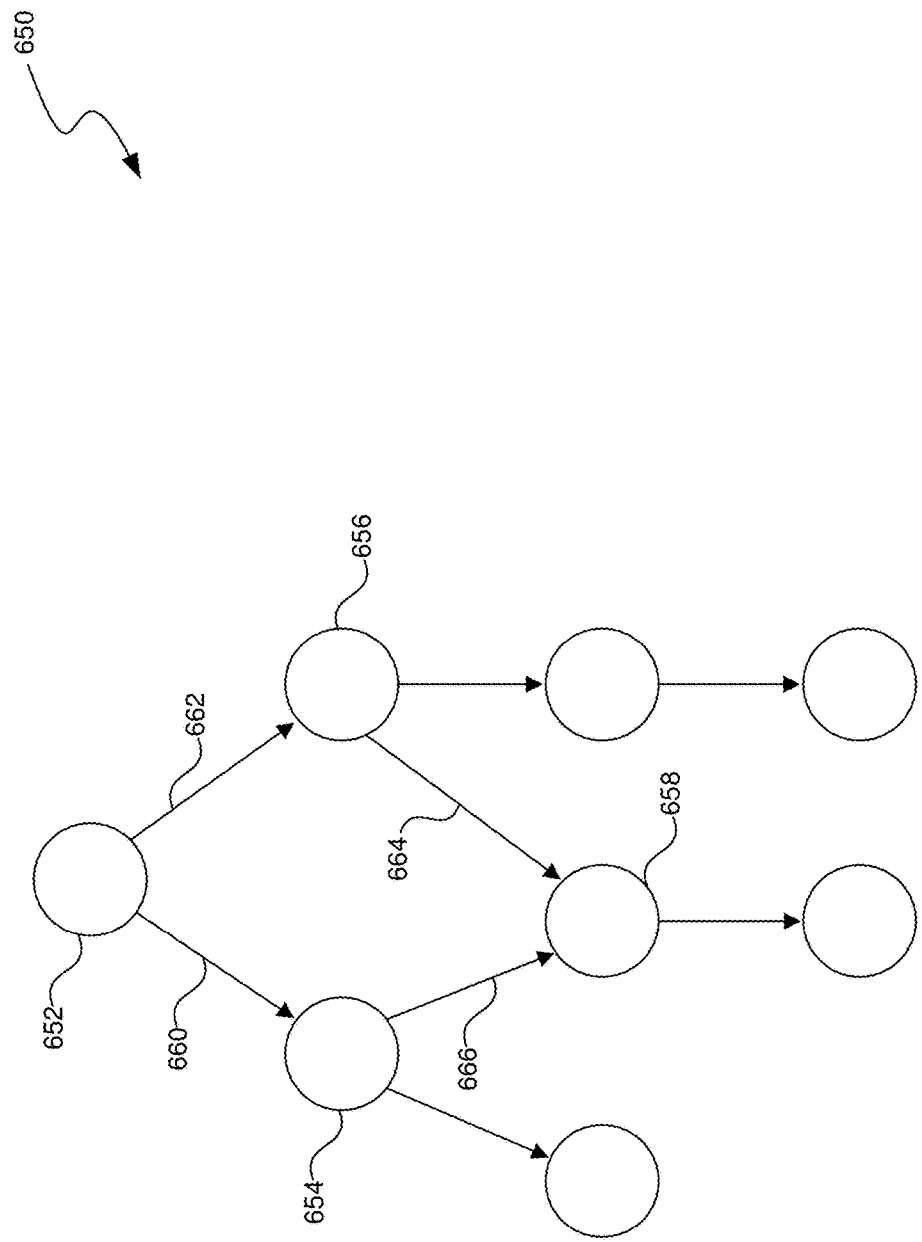
FIG. 6B is a block diagram illustrating a hierarchy for an XRE schema.

FIG. 6B is a block diagram illustrating a hierarchy for an XRE schema. An artificial reality environment can have a hierarchy, including all the elements defined for that artificial reality environment. In some implementations, the hierarchy is defined as a directed acyclic graph (DAG). In some implementations, the hierarchy can be a separate data structure from the set of elements defined in the artificial reality environment, which can be traversed through functions defined for hierarchy nodes such as getParent( ), getChildren( ), getFirstChild( ), getSiblings( ), etc. In other implementations, the hierarchy can exist by virtue of the links between elements formed through the component lists in entities and the entity lists in components, where the hierarchy can be traversed through functions defined for the elements such as getParent( ), getChildren( ), getFirstChild( ), getSiblings( ), etc. In some implementations, each hierarchy has a consistent type of root node, such as a "room" entity (see definition in FIG. 7A). In example 650, root node 652 is a room node, with child nodes 654 and 656, as indicated by edges 660 and 662. In some implementations, each non-root node may have exactly one parent node. In other cases, as in example 650, a node may have multiple parents. For example, node 658 is a node corresponding to a floor entity, node 654 is a PhysicalBoundaries component of the room entity 652 and node 656 is a container component of the room entity 652. The floor entity 658 is a child of both the PhysicalBoundaries component 654 and the container component 656 as indicated by the edges 664 and 666.

Figure 7A:
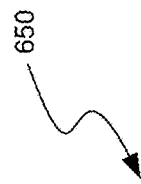
Figure 7A:
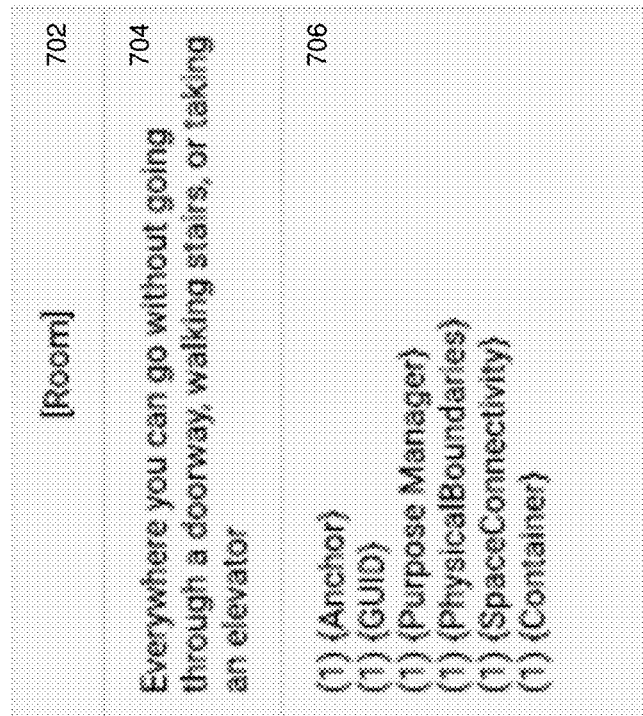

FIGS. 7A-7G are block diagrams illustrating example XR elements defined in the XRE schema. FIG. 7A is a block diagram illustrating an example 700 of a room entity XR element. A room is an entity describing a space that is everywhere a user can go without going through a doorway, walking stairs, or taking an elevator. The room entity includes a name "room" 702, a description 704, and a component list 706 specifying the following components: (1) anchor (defining a point in 3D space to which the room is anchored); (1) GUID (defining a globally unique ID for the room); (1) Purpose Manager (defining a one or Zone or Surfaces within the room); (1) PhysicalBoundaries (defining the floors, walls, and/or ceilings of the room); (1) SpaceConnectivity (defining one or more connections such as portals or elevators to other rooms); and (1) Container (defining a generic component to hold the entities in the room).

Figure 7B:
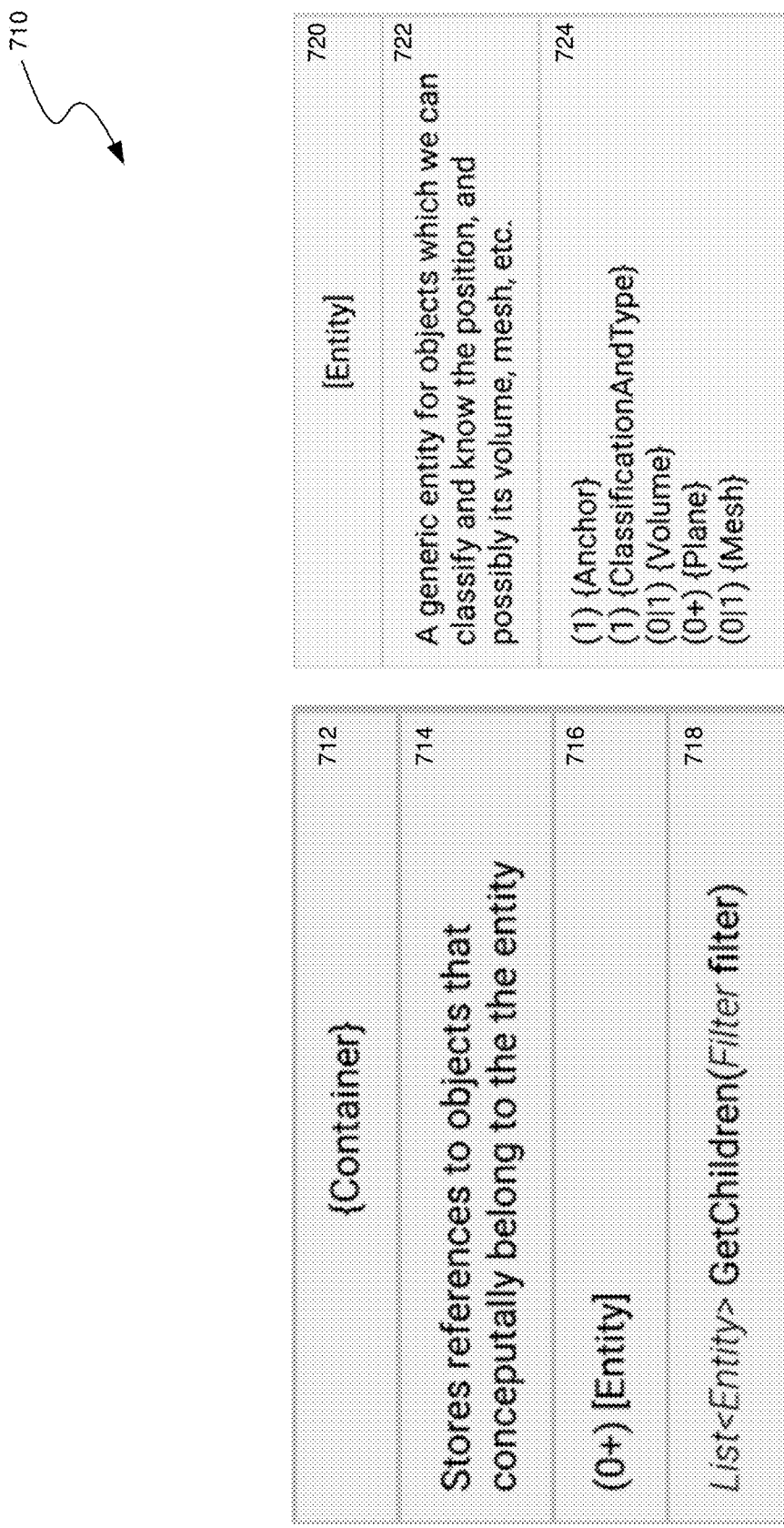

FIG. 7B is a block diagram illustrating an example 710 of generic component and entity XR elements. The generic component includes a name 712 "container," a description 714, an entity list 716 including (0+) entities, and a query list 718 with the GetChildren( ) function which takes a filter and returns a list of entities. The generic entity includes a name 722 "entity," a description 722, and a component list 724 specifying the following components: (1) anchor (defining a point in 3D space to which the entity is anchored); (1) classificationAndType (defining a classification in natural language and a type designation); (0|1) volume (defining a generic 3D volume); (0+) planes (each defining a generic 2D plane); and (0|1) mesh (defining a 3D mesh).

FIG. 7C is a block diagram illustrating an example 725 of meta-data anchor and GUID component XR elements. The anchor component defines a point in space (e.g., where something can be placed, as a transform from a defined origin point). The anchor component includes a name 726 "Anchor," a description 728, and a query list 730 with the GetTransform( ) function which returns the transform from the origin point to the defined anchor point. The GUID component defines a globally unique identifier for an entity that contains this component. The GUID component includes a name 732 "GUID," a description 734, and a query list 736 with the GetGUID( ) function which returns the globally unique identifier.

Figure 7D:
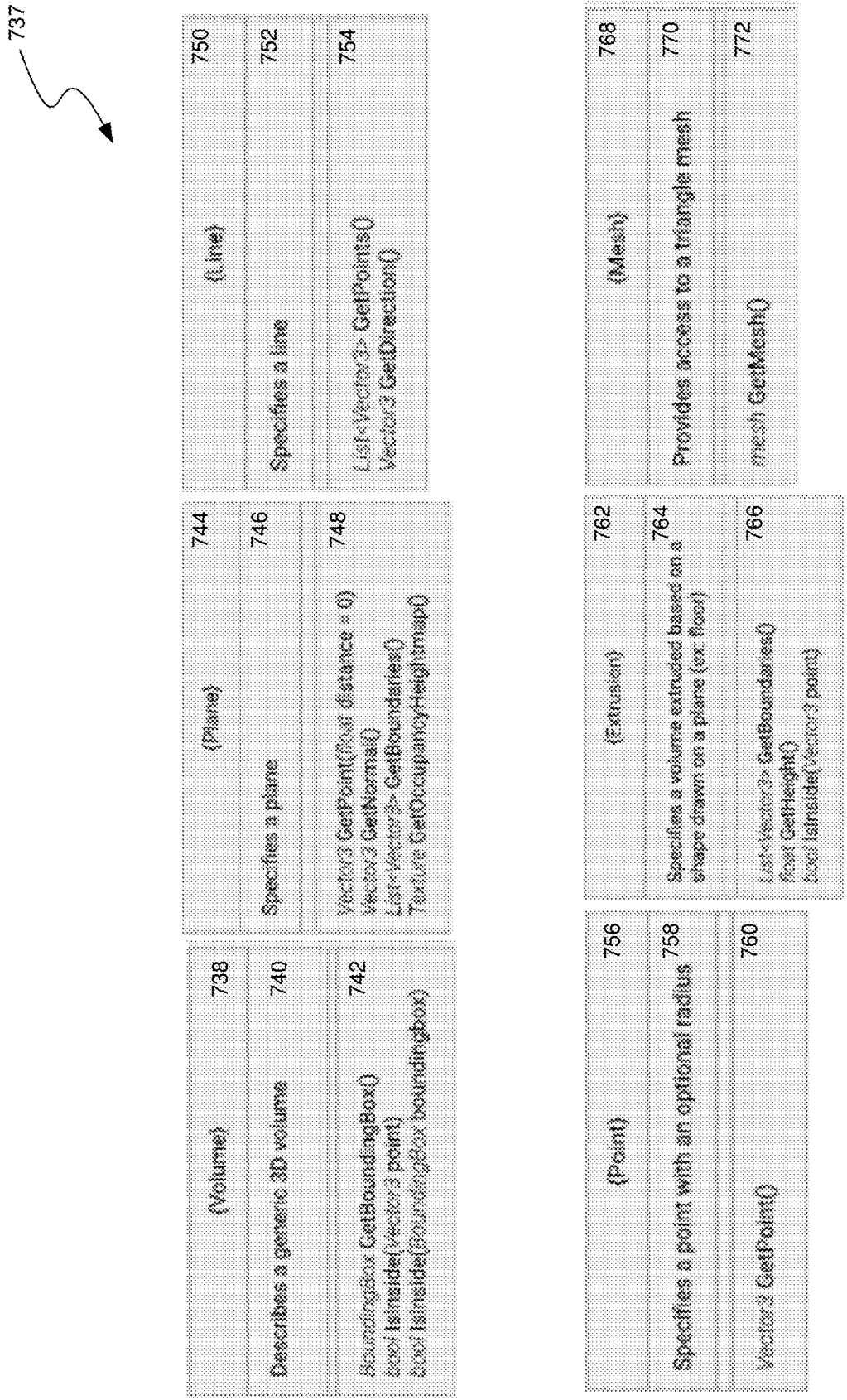

FIG. 7D is a block diagram illustrating an example 737 of fundamental physical XR elements. Fundamental components do not include additional entities but can be combined to make various more complex entities. For example, a box entity could be made up of four plane fundamental components. These fundamental entities may have internal properties accessible through their query lists, such as a line component can have a set of points that can be retrieved with the line's GetPoints( ) function. Example 737 includes a volume fundamental component, a plane fundamental component, a line fundamental component, a point fundamental component, an extrusion fundamental component, and a mesh fundamental component. The volume fundamental component can include a name 738 "Volume," a description 740, and a query list 742 with the functions: GetBoundingBox( ) which returns a BoundingBox of the volume, IsInside( ) which takes a point and returns a boolean indicating whether the provided point is inside the volume, and IsInside( ) which takes a BoundingBox and returns a boolean indicating whether the provided BoundingBox is inside the volume. The plane fundamental component can include a name 744 "Plane," a description 746, and a query list 748 with the functions: GetPoint( ) which takes a float (with a default value of 0) and returns a vector of points on the plane, GetNormal( ) which returns a vector the slope of the plane, GetBoundaries( ) which returns a list of vectors to the points that bound the plane, and GetOccupancyHightmap( ) which returns a texture for the occupancy heightmap of the plane. The line fundamental component can include a name 750 "Line," a description 752, and a query list 754 with the functions: GetPoints( ) which returns a list of vectors of the start and end points of the line and GetDirection( ) which returns an direction (if any) for the line. The point fundamental component can include a name 756 "Point," a description 758, and a query list 760 with the function: GetPoint( ) which returns a vector with the point. The extrusion fundamental component can include a name 762 "Extrusion," a description 764, and a query list 766 with the functions: GetBoundaries( ) which returns a list of vectors to the points that bound the extrusion, GetHeight( ) which returns a float specifying the amount the extrusion extrudes, and IsInside( ) which takes a point and returns a boolean indicating whether the provided points is inside extrusion. The mesh fundamental component can include a name 768 "Mesh," a description 770, and a query list 772 with the function: GetMesh( ) which returns the mesh. In some implementations, the "Get" functions defined herein provide access to an object which can further be manipulated while in other implementations the Get functions have corresponding Set functions to set the corresponding property.

Figure 7E:
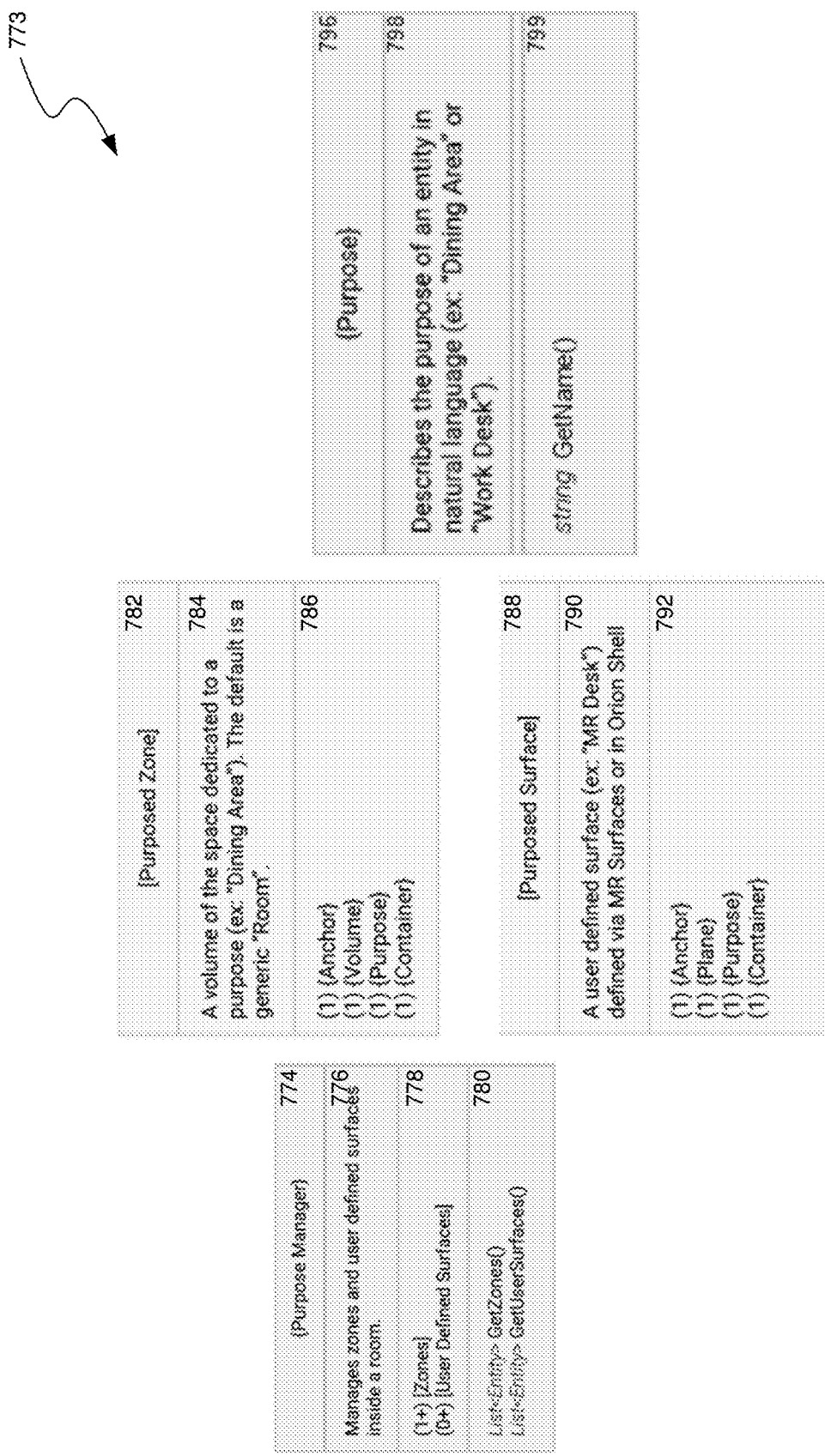

FIG. 7E is a block diagram illustrating an example 773 of purpose components and purposed entity XR elements. Purposed entities include a purposed zone, which is a 3D volume in 3D space dedicated to a defined purpose, and a purposed surface which is a 2D surface in 3D space dedicated to a defined purpose. Purpose components include a purpose manager that contains the purposed zone and surface entities in another entity (e.g., room) while a purpose is a component of a purposed zone or purposed surface specifying the purpose of that zone or surface. The purpose manager component can include a name 774 "Purpose Manager," a description 776, an entity list 778 with entities: (1+) purposed zones and (0+) purposed surfaces, and a query list 780 with the functions: GetZone( ), which returns a list of purposed zone entities and GetUserSurfaces( ), which returns a list of purposed surface entities. The purposed zone entity can include a name 782 "Purposed Zone," a description 784, and a component list 786 with components: (1) anchor component, (1) volume component, (1) purpose components, and (1) container component. The purposed surface entity can include a name 788 "Purposed Surface," a description 790, and a component list 792 with components: (1) anchor component, (1) plane component, (1) purpose components, and (1) container component. The purpose component can include a name 796 "Purpose," a description 798, and a query list 799 with the function: GetName( ), which returns the name of the zone or surface as a string.

FIG. 7F is a block diagram illustrating an example 701 of XR elements that define connections between multiple spaces. Connecting spaces is generally performed through the addition of a SpaceConnectivity component to a root entity of an artificial reality environment hierarchy. The SpaceConnectivity component then includes special connection entities (such as portal or elevator) that connects the space to another space. Each of these connection entities can include a connection component (a PairConnection or a MultiConnection) that includes one or more root entities for the hierarchy of other spaces. Example 701 includes a SpaceConnectivity component, portal and elevator connection entities, and PairConnection and MultiConnection connection components. The SpaceConnectivity component can include a name 703 "SpaceConnectivity," a description 769, an entity list 705 with entities: (0+) portals and (0+) elevators, and a query list 707 with the functions: GetDorrways( ), which returns a list of the connected portal entities, GetConnectedRoom( ), which takes a PairConnection component and returns a GUID for the entity that is connected to the current space via the provided PairConnection component, GetElevators( ), which returns a list of the connected elevator entities, and GetConnectedRoom( ), which takes a MultiConnection component and returns a list of GUIDs for the entities that are connected to the current space via the provided MultiConnection component. The portal entity can include a name 709 "Portal," a description 711, and a component list 713 with components: (1) anchor component and (1) PairConnection component. The elevator entity can include a name 715 "Elevator," a description 717, and a component list 719 with components: (1) anchor component and (1) MultiConnection component. The PairConnection component can include a name 721 "PairConnection," a description 723, an entity list 272 with (2) room entities (the rooms connected by the PairConnection), and a query list 729 with the function: GetRooms( ), which returns a list of the GUIDs for the rooms connected by the PairConnection. The MultiConnection component can include a name 731 "MultiConnection," a description 733, an entity list 235 with (2+) room entities (the rooms connected by the MultiConnection), and a query list 739 with the function: GetRooms( ), which returns a list of the GUIDs for the rooms connected by the MultiConnection.

Figure 7G:
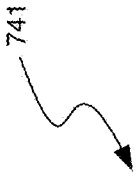

FIG. 7G is a block diagram illustrating an example 741 of physical boundary XR elements. The physical boundaries of a space can include a PhysicalBoundaries component, typically found in the root node of a hierarchy and including any wall, floor, or ceiling physical boundary entities for the space. Example 741 includes a PhysicalBoundaries component and Wall, Floor, and Ceiling boundary entities. The PhysicalBoundaries component can include a name 743 "PhysicalBoundaries," a description 745, an entity list 747 with entities: (0+) wall entities, (0+) floor entities, and (0+) ceiling entities, and a query list 749 with the functions: Raycast( ), which takes a ray (virtual pointing) object and returns information on which physical boundary entity that ray collides with, and GetBoundingBox( ), which returns a bounding box formed by the physical boundary entities included in the entity list 747 of the PhysicalBoundaries component. The Wall entity can include a name 751 "Wall," a description 753, and a component list 755 with components: (1) anchor component, (1) container component, and (1) plane component. The Floor entity can include a name 757 "Floor," a description 759, and a component list 761 with components: (1) anchor component, (1) container component, and (1) plane component. The Ceiling entity can include a name 763 "Ceiling," a description 765, and a component list 767 with components: (1) anchor component, (1) container component, and (1) plane component. Note that the Wall, Floor, and Ceiling entities have the same set of components. In some implementations, instead of these three entities, a single Boundary entity could be used. However, in example, separate entities are defined due to typical different use cases for these types of boundaries.

While there are infinite possible combinations of entities and components that can be used for additional elements, some examples of additional entities include a desk, cabinet, shelf, wardrobe, window, door, poster, painting, table, plant, lamp, screen, pen, phone, wallet, keys, etc.

Those skilled in the art will appreciate that the components illustrated in FIGS. 1-7 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 8:
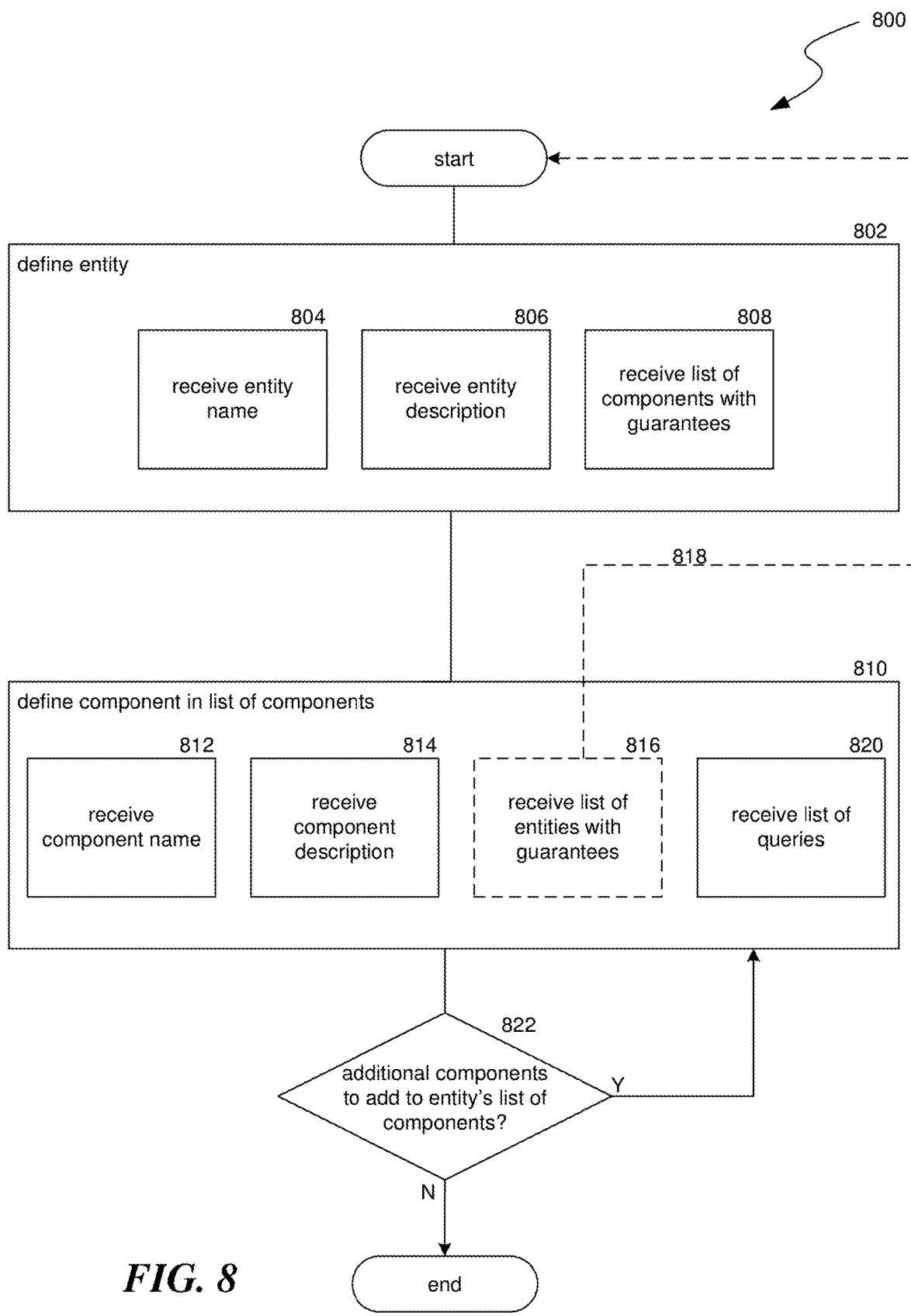
FIG. 8 is a flow diagram illustrating a process used in some implementations of the present technology for a producer defining an element in an XRE schema.

FIG. 8 is a flow diagram illustrating a process 800 used in some implementations for a producer defining an element in the XRE schema. Process 800 is shown from the perspective of the computing system that receives the parameters for a new element and establishes the variables and functions that will be set when an instance of the element is constructed by an instantiator. In some implementations, process 800 can be performed in a developer's computing system (e.g., third-party developer or XR system administrator) e.g., via a programming interface and/or compiler, where defined elements can then be made available for instantiators on an XR system.

At block 802, process 800 can define an entity element. An entity can represent a real or virtual object or space, within an artificial reality environment, defined by a name and a collection of one or more components. This can include the three steps (which may be performed in various orders) of receiving a name for the entity at block 804, receiving a description for the entity at 806, and receiving a list of components for the entity at 808. One or more of the components on the list of components can include a guarantee, specifying an amount of each component type that must be included in the entity. A constructor for the entity can be defined that takes the specified guaranteed amount of each component type and returns the constructed entity. In various implementations, the listed components in a constructed instance of an entity can be directly read or set by an application that has access to the entity or by calling a Get( ) or Set( ) function for that component of the entity.

At block 810, process 800 can define a component, in the list of components specified at block 808. In some cases, a listed component may already have been defined, (e.g., the component is one of the standard components described in FIGS. 7A-7G or is another known component available through a repository of pre-defined components), in which case the existing component definition can be used instead of defining a new component at block 810. Where a component is not pre-defined, the definition process at block 810 can include the four steps (which may be performed in various orders) of receiving a name for the component at block 812, receiving a description for the component at 814, receiving a list of entities for the component at 816, and receiving a list of queries (i.e., functions) for the component at 820. One or more of the entities on the list of entities can include a guarantee, specifying an amount of each entity type that must be included in the component. A constructor for the component can be defined that takes the specified guaranteed amount of each entity type and returns the constructed component.

As discussed above, any block can be removed or rearranged in various implementations. However, block 816 is shown in dashed lines to indicate there are specific instances where block 816 is skipped—e.g., where the list of entities for a component is empty. As indicated by dashed line 818, where block 816 is performed, an instance of process 800 can be performed for each specified entity, allowing that instance of process 800 establish the variables and components of each entity. In some cases, an listed entity may already have been defined, (e.g., the entity is one of the standard entities described in FIGS. 7A-7G or is another known entity available through a repository of pre-defined entities), in which case the existing element definition can be used instead of executing a new instance of process 800.

While a producer can define any number of queries for the list of queries for the component at 820, in some implementations, some default queries can also be included, such as queries to get or set values for the list of entities of the component. In other implementations, these values can be directly read and written to from the component, and thus a Get( ) and Set( ) function is not needed.

At block 822, if all of the components in the list of components from block 808 have not been defined, process 800 can return to block 810 to define the next component. If all of the components in the list of components from block 808 have been defined, process 800 can end.

Once complete, the entity and/or component definitions created through process 800 can be stored and made available to various entities in an XR system. For example, the element definition can be included in an application, can be part of an XR system control application (e.g., Operating System), or can be provided via a remote call to a cloud-system. As a first example, process 800 can be performed as part of developing an application using the XRE schema, that application can be downloaded to an XR device, and the element definitions from the application (made with process 800) can be used by the application, or in some cases by other applications on the XR device, to instantiate an instance of the defined element.

As a second example, an XR device administrator may define one or more elements (pre-installed or delivered to the XR device via an update or element pack) that the XR device control application is configured to instantiate when it recognizes matching features in an artificial reality environment. As a more specific version of this second example, the defined element can be a desk entity and the control application is configured to automatically instantiate an instance of the desk (by calling the desk's constructor) when computer vision systems recognize a horizontal surface of a particular size with a proximate chair. In this second example, the recognized surface can be passed as a parameter to the desk constructor.

As a third example, a user can define a set of nature elements for an application to recognize when in a particular area, the user can share that nature element set with a friend who the user knows is interested in hiking—allowing applications on the friend's XR system to recognize and instantiate instances of the nature elements when their components are recognized in the friend's artificial reality environment.

Figure 9:
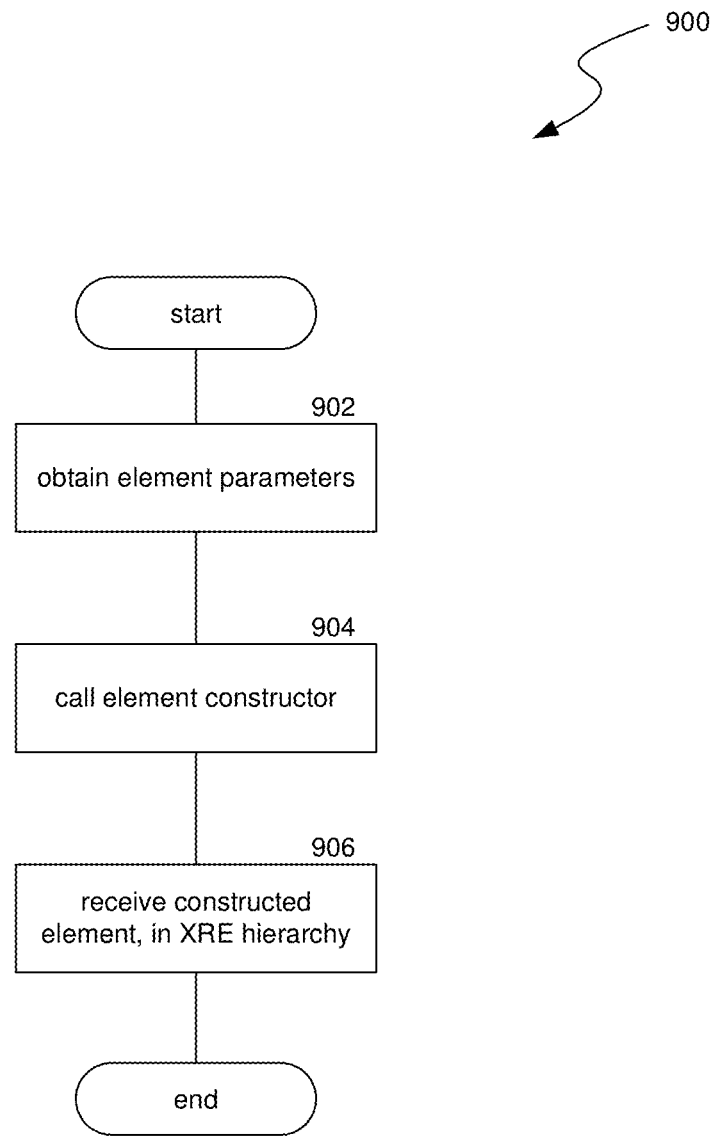
FIG. 9 is a flow diagram illustrating a process used in some implementations of the present technology for an instantiator to create an element instance, in an XRE schema, using an element definition defined by a producer.

FIG. 9 is a flow diagram illustrating a process 900 used in some implementations of the present technology for an instantiator to create an element, in the XRE schema, using an element definition defined by a producer. For example, a producer can define one or more elements using process 800, instances of which can be created by instantiators calling constructors for the element. Via an API or other access to the constructor, a definition can be provided for each element specifying parameters that are required to create the elements. In some implementations, process 900 can be performed by an instantiator that is part of a system control application or a third party application. For example, a system control application can be configured to automatically instantiate some elements when the parameters for that element are recognized or when certain triggers occur—such as by generating a room entity when the XR device determines that the user has moved into a new room. As a further example, an application can instantiate a new element defined, according to the XRE schema, within the programming of that application. The application can then have the new element added as a part of an existing set of artificial reality environment elements and add the new element to the hierarchy for a space.

At block 902, process 900 can obtain the element parameters needed for a constructor of an element to be instantiated. The parameters needed can be defined in a definition for the constructor—e.g., via a defined API. While the parameters of an element can be any data available on an XR device, some examples of element parameters include: a defined anchor point; a defined parent element; identified real-world surfaces; an identified user; a color, texture, or other visual appearance for the element; meta-data features for the element; identified objects the element will be related to; identified user input or commands; etc.

At block 904, process 900 can call a constructor for the element to be instantiated. As discussed above, this constructor can be available by virtue of the constructor being part of the instantiator application, through local or cloud-based API, or through other system calls the instantiator has permission to access. Calling the constructor can include passing the element parameters obtained at block 902 to the constructor. In some implementations, the call to a constructor can be a call that specifies one or more parent elements of the instance of the element to be instantiated. For example, the call can indicate an element the new element will be liked to in that element's list of entities or list of components. As another example, the call can specify one or more hierarchy nodes that will be the parent element(s) for the new element.

At block 906, process 900 can receive the element constructed by the constructor called at block 904. Where a parent element was defined for the constructor, the returned element can already be linked to that parent element and can be included in the hierarchy. In other cases, process 900 can link the new element as a child of another element and/or add the new element to the hierarchy. These relationships between elements can allow consumers to read data about the elements in a space and update element parameters.

Figure 10:
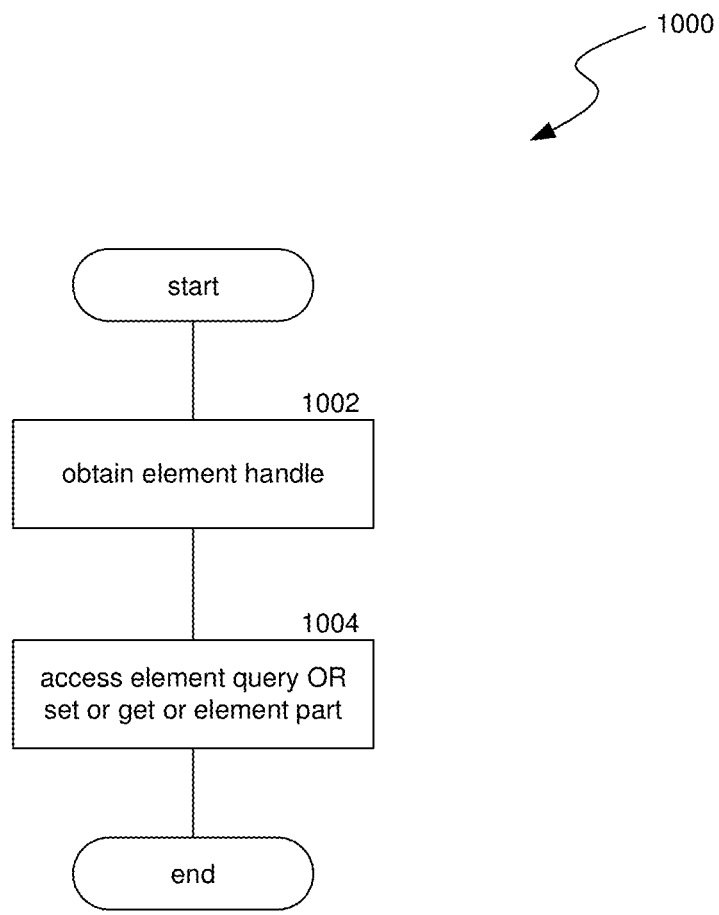
FIG. 10 is a flow diagram illustrating a process used in some implementations of the present technology for a consumer to query and interact with elements, in an XRE schema.

FIG. 10 is a flow diagram illustrating a process 1000 used in some implementations of the present technology for a consumer to query and interact with elements defined in the XRE schema. Process 1000 can be performed on an XR device by a consumer, such as an application or system component, to query and set aspects of the artificial reality environment. For example, an application can traverse a hierarchy for a space, search for an element by name or ID, or get elements of a particular type.

At block 1002, process 1000 can obtain a handle for an element defined in a space (e.g., an element instantiated by process 900). An element handle can be the element itself, a pointer to the element, an ID for the element, or other handle that can be used to access functions and/or parameters of an element. For example, an application can request, through a control application of an XR device, a hierarchy corresponding to the space the XR device is currently in, allowing the application to traverse the hierarchy; the application can request an identifier for an element at a given location; the application can request handles for one or more elements by element name or by element type; an element handle can be passed to an application from another application; etc.

At block 1004, process 1000 can use the handle obtained at block 1002 to query and interact with parts of the element. For example, the handle can be a reference to the element "XYZ," an application can have a new anchor point "AP," and the application can perform an operation "XYZ.anchor=AP" to move the element XYZ to the new anchor point AP in the artificial reality environment. As another example, the handle can be reference to an elevator entity "ELV," and an application can perform an operation "ELV.MultiConnection.GetRooms( )" to execute the "GetRooms( )" function of the multiConnection component of the elevator entity; this can return a list of the GUIDs for the rooms connected to that MultiConnection component. The consumer can perform various other actions to get and set properties of the components in a space, traverse the hierarchy, and/or communicate spatial information to other applications. In some cases, applications with proper permissions can also share handles with other applications and/or send elements to other XR device (whether of the same or different XR type).

Figure 11A:
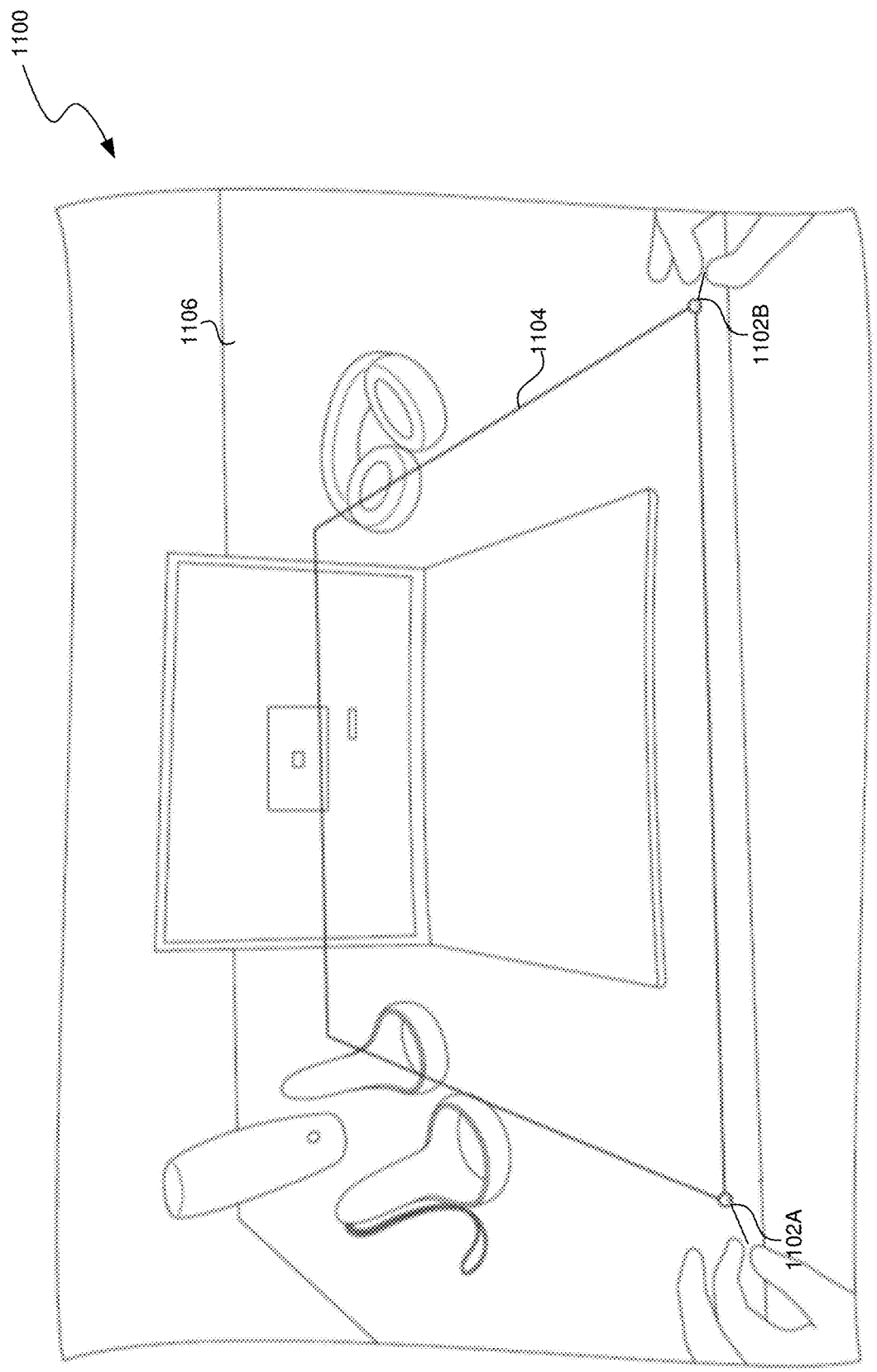
FIGS. 11A and 11B are block diagrams illustrating and example instantiation of a desk entity in an existing container component of a room entity.
Figure 11B:
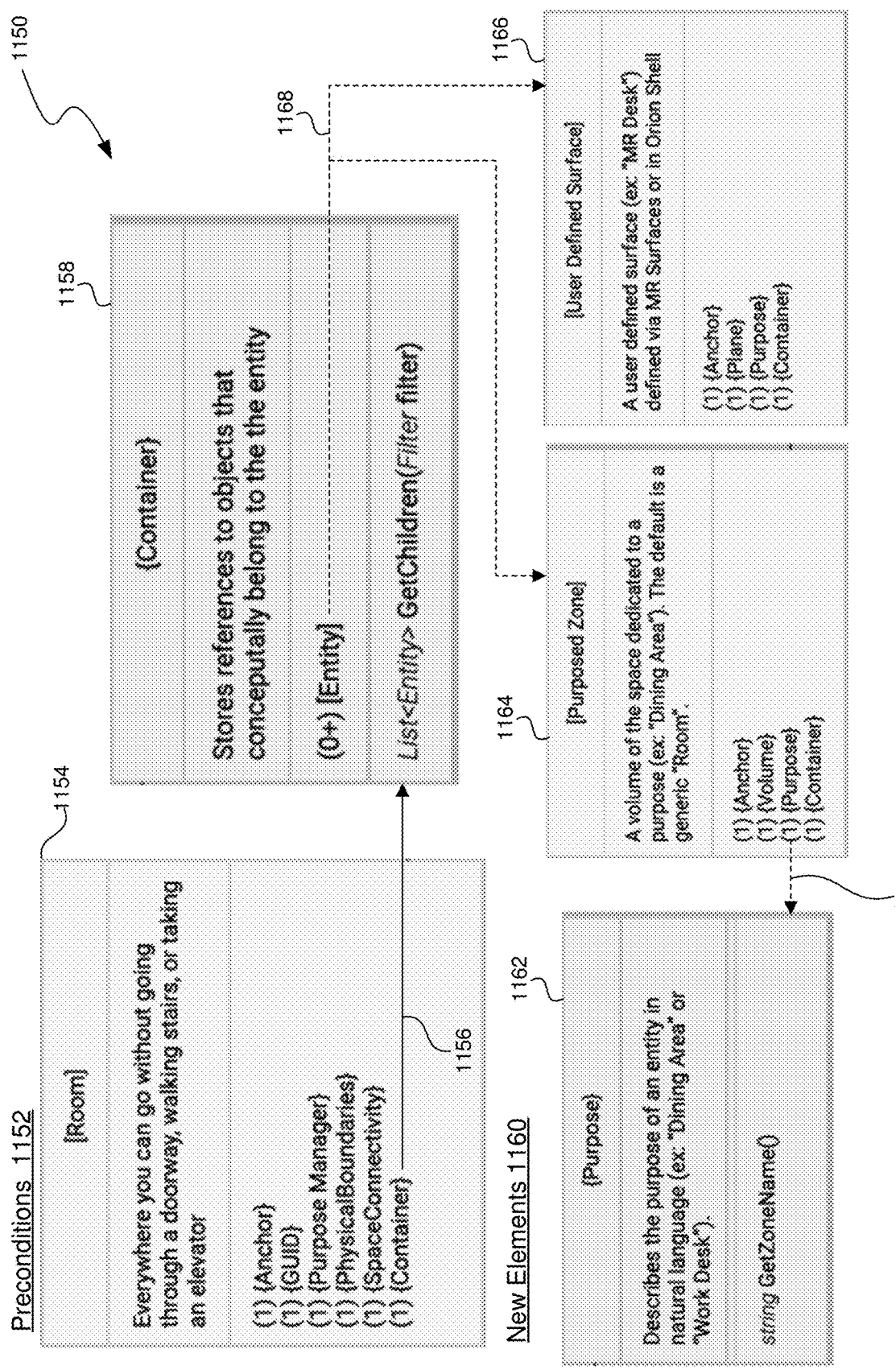

FIGS. 11A and 11B are block diagrams illustrating and example instantiation of a desk entity in an existing container component of a room entity. FIG. 11A illustrates example 1100 where a user is providing parameters for the instantiation of the desk entity. In example 1100, a user has provided a command to create a desk surface 1104 and is controlling control points 1102A and 1102B, to define the bounds of the desk surface 1104. The XR device has recognized a physical surface 1106 to on which the desk surface 1104 is fixed. The combination of the height of the physical surface 1106 and the bounds set by control points 1102A and 1102B define the parameters for instantiating the desk surface 1104.

FIG. 11B illustrates example 1150 showing precondition elements that are required by a constructor to create the desk entity and resulting elements generated by instantiating the desk entity. Example 1150 shows preconditions 1152 as the elements that have to exist for the desk construction to be called and new elements 1160 which are some of the elements that are created as a result of calling the desk constructor. Preconditions 1152 include a room entity 1154 linked to (as indicated by line 1156) a container 1158. These are preconditions because, in this example, it's required for a room element be a root node of a space hierarchy, and thus for the desk to be added to the space the room of the space must first be defined and it must have a container component to hold additional entities. Upon the user performing the actions shown in FIG. 11A to define parameters of the desk entity, these parameters are used to call a desk constructor specifying the container 1158 as the parent component. The desk constructor is configured to create (as shown by line 1168) a purposed zone 1164 and a user defined surface 1166. Each of these entities further have constructors that create additional components, an example of which is purpose 1162, created at line 1170, as the purpose component of purposed zone 1164.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for device-agnostic representation of an artificial reality environment (XRE) using an XRE schema, the method comprising:
defining multiple features, in the artificial reality environment, each as an element defined by the XRE schema as either an entity or a component,
wherein the elements include at least one entity and each entity has a defined name, definition, and component list,
wherein the elements include at least one component and at least one component has a defined name, definition, entity list, and query list, and
wherein at least one element comprises one or more quantity guarantees with respect to its component list or entity list;
performing, for the elements defined by the XRE schema, application programming interface element constructor calls,
wherein constructed instances for the elements are returned in response to the element constructor calls, and
wherein at least one of the called element constructors that corresponds to the at least one element enforces the one or more quantity guarantees with respect to its component list or entity list; and
adding a node for each of the constructed instances of each element to a directed acyclic graph hierarchy for the artificial reality environment,
wherein the hierarchy has a pre-defined type of a root node that corresponds to an entity element,
wherein each edge in the hierarchy specifies a parent/child link between elements where the parent element contains the child element;
wherein the entity corresponding to the root node links to a physical boundaries component linked to one or more wall, floor, and/or ceiling entities; and wherein the method is performed on a first type of artificial reality device and at least one of the elements is accessed by a second type of artificial reality device with a type different from the first type of artificial reality device.

2. The method of claim 1, wherein each entity only links to components and each component only links to entities.

3. The method of claim 1,
wherein the at least one element comprises two elements including a first entity and a first component,
wherein the first entity specifies multiple component quantity guarantees, each component quantity guarantee defining an amount of components of a particular type the first entity is linked to; and
wherein the first component specifies at least one entity quantity guarantee, each entity quantity guarantee defining an amount of entities of a particular type the first component is linked to.

4. The method of claim 1, wherein the root node is for a room entity specifying an area that is traversable without going through a doorway, taking stairs, or taking an elevator.

5. The method of claim 1, wherein each entity element is linked to an anchor component specifying where in 3D space the entity exists in relation to an origin point.

6. The method of claim 1,
wherein the hierarchy is a first hierarchy and the root node is a first root node, and
wherein the entity corresponding to the first root node includes a component that defines a connection to a second root node of a second hierarchy for another artificial reality environment.

7. The method of claim 1, wherein multiple of the elements, defined by the XRE schema, were defined by a producer process including:
defining an entity specifying at least an entity name and a list of components for the entity with associated component amount guarantees; and
for at least one particular component in the list of components, defining the particular component specifying a component name, a list of entities for the particular component with associated entity amount guarantees, and a query list for functions configured to act in relation to the particular component.

8. The method of claim 1, wherein performing the application programming interface element constructor calls further comprises:
obtaining element parameters corresponding to one or more element constructors defined for the elements,
wherein, for a particular one of the elements, one or more of the element parameters were generated by machine perception systems that automatically identified aspects of the real world around the artificial reality device of the first type; and
calling the one or more element constructors.

9. The method of claim 1, wherein performing the application programming interface element constructor calls further comprises:
obtaining element parameters corresponding to one or more element constructors defined for the elements, wherein at least one element constructor is defined by a producer process; and
calling the one or more element constructors.

10. The method of claim 1, wherein at least one particular element, of the elements, is acted upon by a consumer by:
obtaining a handle for the at least one particular element; and
accessing, via the handle, a query from a query list of the at least one particular element or setting or getting, via the handle, an element part of the at least one particular element.

11. The method of claim 1, wherein the first type of artificial reality device is a virtual reality device and the second type of artificial reality device is a mixed reality device.

12. The method of claim 1, wherein at least four of the elements are a plane, a line, a point, and a mesh fundamental component elements, each linked to an entity.

13. The method of claim 1,
wherein at least one particular element of the elements is a purpose manager component linked to one or more purposed zone entities and/or one or more purposed surfaces entities;
wherein each of the one or more purposed zone entities is linked to at least an anchor component defining a position in 3D space, a volume component defining a volume in the 3D space, and a purpose component specifying a natural language purpose of the purposed zone; and
wherein each of the one or more purposed surface entities is linked to at least an anchor component defining a position in 3D space, a plane component defining a plane in the 3D space, and a purpose component specifying a natural language purpose of the purposed surface.

14. A computing system for device-agnostic representation of an artificial reality environment (XRE) using an XRE schema, the computing system comprising:
one or more processors; and
one or more memories storing instructions that, when executed by the one or more processors, cause the computing system to perform a process comprising:
defining multiple features, in the artificial reality environment, each as an element defined by the XRE schema as either an entity or a component,
wherein the elements include at least one entity and each entity has a defined name and component list,
wherein the elements include at least one component with a defined name, entity list, and query list, and
wherein at least one element comprises one or more quantity guarantees with respect to its component list or entity list;
performing, for the elements defined by the XRE schema, application programming interface element constructor calls,
wherein constructed instances for the elements are returned in response to the element constructor calls, and
wherein at least one of the called element constructors that corresponds to the at least one element enforces the one or more quantity guarantees with respect to its component list or entity list; and
adding a node for each of the constructed instances of each element to a hierarchy for the artificial reality environment,
wherein the hierarchy has a pre-defined type of a root node that corresponds to an entity element,
wherein each edge in the hierarchy specifies a parent/child link between elements,
wherein the entity corresponding to the root node links to a physical boundaries component linked to one or more wall, floor, and/or ceiling entities, and wherein the computing system is a first type of artificial reality device and at least one of the elements is accessed by a second type of artificial reality device with a type different from the first type of artificial reality device.

15. The computing system of claim 14, wherein the entity corresponding to the root node links to a physical boundaries component linked to a wall entity.

16. The computing system of claim 14,
wherein the computing system is a mixed reality device; and
wherein at least one of the elements is accessed by a virtual reality device different from the mixed reality device.

17. The computing system of claim 14, wherein at least four of the elements are a plane, a line, a point, and a mesh fundamental component elements, each linked to an entity.

18. A non-transitory computer-readable storage medium storing instructions that, when executed by a computing system, cause the computing system to perform a process for device-agnostic representation of an artificial reality environment (XRE) using an XRE schema, the process comprising:
defining multiple features, in the artificial reality environment, each as an element defined by the XRE schema as either an entity or a component,
wherein the elements include at least one entity and each entity has a defined name, definition, and component list,
wherein the elements include at least one component and at least one component has a defined name, definition, entity list, and query list, and
wherein at least one element comprises one or more quantity guarantees with respect to its component list or entity list;
performing, for the elements defined by the XRE schema, application programming interface element constructor calls,
wherein constructed instances for the elements are returned in response to the element constructor calls, and
wherein at least one of the called element constructors that corresponds to the at least one element enforces the one or more quantity guarantees with respect to its component list or entity list; and
adding a node for each of the constructed instances of each element to a directed acyclic graph hierarchy for the artificial reality environment,
wherein the hierarchy has a pre-defined type of a root node that corresponds to an entity element,
wherein each edge in the hierarchy specifies a parent/child link between elements where the parent element contains the child element; and
wherein the entity corresponding to the root node links to a physical boundaries component linked to one or more wall, floor, and/or ceiling entities;
wherein the method is performed on a first type of artificial reality device and at least one of the elements is accessed by a second type of artificial reality device with a type different from the first type of artificial reality device.

19. The non-transitory memory of claim 18, wherein the entity corresponding to the root node links to a physical boundaries component linked to a floor entity.

20. The non-transitory memory of claim 18,
wherein the at least one element comprises two elements including a first entity and a first component,
wherein the first entity specifies multiple component quantity guarantees, each component quantity guarantee defining an amount of components of a particular type the first entity is linked to; and
wherein the first component specifies at least one entity quantity guarantee, each entity quantity guarantee defining an amount of entities of a particular type the first component is linked to.

* * * * *